(12) United States Patent
Galati et al.

(10) Patent No.: US 9,448,793 B2
(45) Date of Patent: *Sep. 20, 2016

(54) AUTOMATED DECOMPOSITION FOR MIXED INTEGER LINEAR PROGRAMS WITH EMBEDDED NETWORKS REQUIRING MINIMAL SYNTAX

(71) Applicant: SAS Institute Inc., Cary, NC (US)

(72) Inventors: Matthew Victor Galati, Glen Mills, PA (US); Robert William Pratt, Niskayuna, NY (US); Leonardo Bezerra Lopes, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/936,952

(22) Filed: Nov. 10, 2015

(65) Prior Publication Data
US 2016/0077833 A1 Mar. 17, 2016

Related U.S. Application Data

(63) Continuation of application No. 14/722,624, filed on May 27, 2015, now Pat. No. 9,213,550.

(60) Provisional application No. 62/003,542, filed on May 27, 2014.

(51) Int. Cl.
*G06F 9/30* (2006.01)
*G06F 17/11* (2006.01)

(52) U.S. Cl.
CPC ....... *G06F 9/30007* (2013.01); *G06F 9/30145* (2013.01); *G06F 17/11* (2013.01)

(58) Field of Classification Search
CPC .. G06F 9/3836; G06F 9/30007; G06F 17/10; G06F 17/11
See application file for complete search history.

(56) References Cited

U.S. PATENT DOCUMENTS

| | | | |
|---|---|---|---|
| 9,213,550 B1 * | 12/2015 | Galati | G06F 9/3836 |
| 2006/0112049 A1 * | 5/2006 | Mehrotra | G06F 17/11 706/46 |
| 2009/0228417 A1 * | 9/2009 | Rothberg | G06N 3/126 706/46 |
| 2010/0332599 A1 * | 12/2010 | Tapolcai | G06F 9/5066 709/205 |
| 2014/0122390 A1 * | 5/2014 | Narisetty | G06N 99/005 706/12 |

* cited by examiner

*Primary Examiner* — Chuong D Ngo

(57) ABSTRACT

Embodiments include techniques to receive computer-executable query instructions to solve a MILP problem, the query instructions including a first expression conveying an objective function and side constraint that define a master problem of the MILP problem, a second expression conveying a mapping of graph data to a graph, and a third expression conveying a selection of a graph-based algorithm to solve a subproblem of the MILP problem; a subproblem component to replace the third expression with a fourth expression during decomposition of the MILP problem, the fourth expression including instructions to implement the graph-based algorithm to solve the subproblem; and an execution control component to perform iterations of solving the MILP problem that include executing the first expression to derive a solution to the master problem; and executing the fourth expression to derive a solution to the subproblem based on the mapping and the master problem solution.

20 Claims, 16 Drawing Sheets

AUTOMATED DECOMPOSITION FOR MIXED INTEGER LINEAR PROGRAMS WITH EMBEDDED NETWORKS REQUIRING MINIMAL SYNTAX

CROSS-REFERENCE TO RELATED APPLICATIONS

This application claims the benefit of priority under 35 U.S.C. §119(e) to U.S. Provisional Application Ser. No. 62/003,542 entitled "AUTOMATED DECOMPOSITION FOR MIXED INTEGER LINEAR PROGRAMS WITH EMBEDDED NETWORKS REQUIRING MINIMAL SYNTAX" filed May 27, 2014, the entirety of which is incorporated herein by reference.

This application is a continuation of and claims the benefit of priority under 35 U.S.C. §120 to U.S. patent application Ser. No. 14/722,624 entitled "AUTOMATED DECOMPOMPOSITION FOR MIXED INTEGER LINEAR PROGRAMS WITH EMBEDDED NETWORKS REQUIRING MINIMAL SYNTAX" filed May 27, 2015, the entirety of which is incorporated herein by reference.

BACKGROUND

Numerous complex problems in a variety of fields from predictive genetic marker analysis to network infrastructure design to operations research logistics planning have proven to be solvable as mixed integer linear programming (MILP) problems. Solving such problems as MILP problems typically entails the iterative solving of multiple equations representing different facets of the MILP problem using mathematical programming-based algorithms to search for a result that minimizes or maximizes a value.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

An apparatus includes a processor component, and a communications component for execution by the processor component to receive computer-executable query instructions to solve a mixed-integer linear programming (MILP) problem. The query instructions include a first expression that conveys an objective function and at least one side constraint of the MILP problem, wherein the objective function and the at least one side constraint define a master problem of the MILP problem; a second expression that conveys a first mapping of data values of graph data associated with the MILP problem to a first graph; and a third expression that conveys a selection of a first graph-based algorithm to solve a first subproblem of the MILP problem based on the first graph. The apparatus further includes a subproblem component for execution by the processor component to replace the third expression in the query instructions with a fourth expression as part of a decomposition of the MILP problem, the fourth expression including instructions to implement the first graph-based algorithm to solve the first subproblem, and an execution control component for execution by the processor component to perform an iteration of solving the MILP problem. The performance of each iteration includes executing the first expression to derive a solution to the master problem, and executing the fourth expression to derive a solution to the first subproblem based on the first mapping and the solution to the master problem.

A computer-program product tangibly embodied in a non-transitory machine-readable storage medium, the computer-program product including instructions operable to cause a computing device to perform computer operations including receive computer-executable query instructions to solve a mixed-integer linear programming (MILP) problem; wherein the query instructions include a first expression conveying an objective function and at least one side constraint of the MILP problem, wherein the objective function and the at least one side constraint define a master problem of the MILP problem; a second expression conveying a first mapping of data values of graph data associated with the MILP problem to a first graph; and a third expression conveying a selection of a first graph-based algorithm to solve a first subproblem of the MILP problem based on the first graph. The computing device is caused to perform further operations including replace the third expression in the query instructions with a fourth expression as part of a decomposition of the MILP problem, the fourth expression including instructions to implement the first graph-based algorithm to solve the first subproblem; and operations of an iteration to solve the MILP problem, wherein the operations of the iteration include executing the first expression to derive a solution to the master problem and executing the fourth expression to derive a solution to the first subproblem based on the first mapping and the solution to the master problem.

A computer-implemented method includes receiving computer-executable query instructions to solve a mixed-integer linear programming (MILP) problem, wherein the query instructions include a first expression conveying an objective function and at least one side constraint of the MILP problem, wherein the objective function and the at least one side constraint define a master problem of the MILP problem; a second expression conveying a first mapping of data values of graph data associated with the MILP problem to a first graph; and a third expression conveying a selection of a first graph-based algorithm to solve a first subproblem of the MILP problem based on the first graph. The computer-implemented method further includes replacing the third expression in the query instructions with a fourth expression as part of a decomposition of the MILP problem, the fourth expression including instructions to implement the first graph-based algorithm to solve the first subproblem; and performing an iteration of solving the MILP problem, wherein performing the iteration includes executing the first expression to derive a solution to the master problem and executing the fourth expression to derive a solution to the first subproblem based on the first mapping and the solution to the master problem.

In some embodiments, the second expression may convey a second mapping of data values of the graph data to a second graph; the third expression may convey a selection of a second graph-based algorithm to solve a second subproblem of the MILP problem based on the second graph; the fourth expression may include instructions to implement the second graph-based algorithm to solve the second subproblem; and performing the iteration may include executing the fourth expression to derive a solution to the second subproblem based on the second mapping and the solution to the master problem. Also, the third expression may include an indication that the first and second subproblems are able to be solved independently of each other, and the computer-implemented method may include detecting the indication that the first and second subproblems are able to be solved independently of each other and generating the fourth expression to cause the derivation of the solutions to the first and second subproblems at least partially in parallel in response to detecting the indication. Further, the performing the iteration may include deriving the solutions to the first and second subproblems at least partially in parallel.

In some embodiments, the computer-implemented method may include initiating a performance of the iteration, determining whether the performance of the iteration solved the MILP problem, and repeating performance of the iteration in response to the MILP problem remaining unsolved. In some embodiments, the data values of the graph data may be associated with at least one of nodes of the first graph, or edges of the first graph that each extend between a pair of nodes of the first graph, and the first graph may be a graph of a network comprising the nodes and the edges. In some embodiments, the computer-implemented method may include receiving the graph data, wherein the data values of the graph data may be associated with nodes of the first graph, and the second expression may include instructions to iterate through the nodes of the first graph. In some embodiments, the computer-implemented method may include receiving the graph data, wherein the data values of the graph data may be associated with edges of the first graph that each extend between a pair of nodes of the first graph, and the second expression may include instructions to iterate through the edges of the first graph. In some embodiments, the computer-implemented method may include presenting, by circuitry on a display, guidance in providing the first, second and third expressions; and monitoring manually-operable controls to receive the first, second and third expressions. In some embodiments, the computer-implemented method may include generating, by circuitry, a visualization of at least the first graph and of a result of solving the MILP problem for presentation on a display.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other features will become apparent from the following detailed description when considered in conjunction with the drawings.

DETAILED DESCRIPTION

Figure 1A:
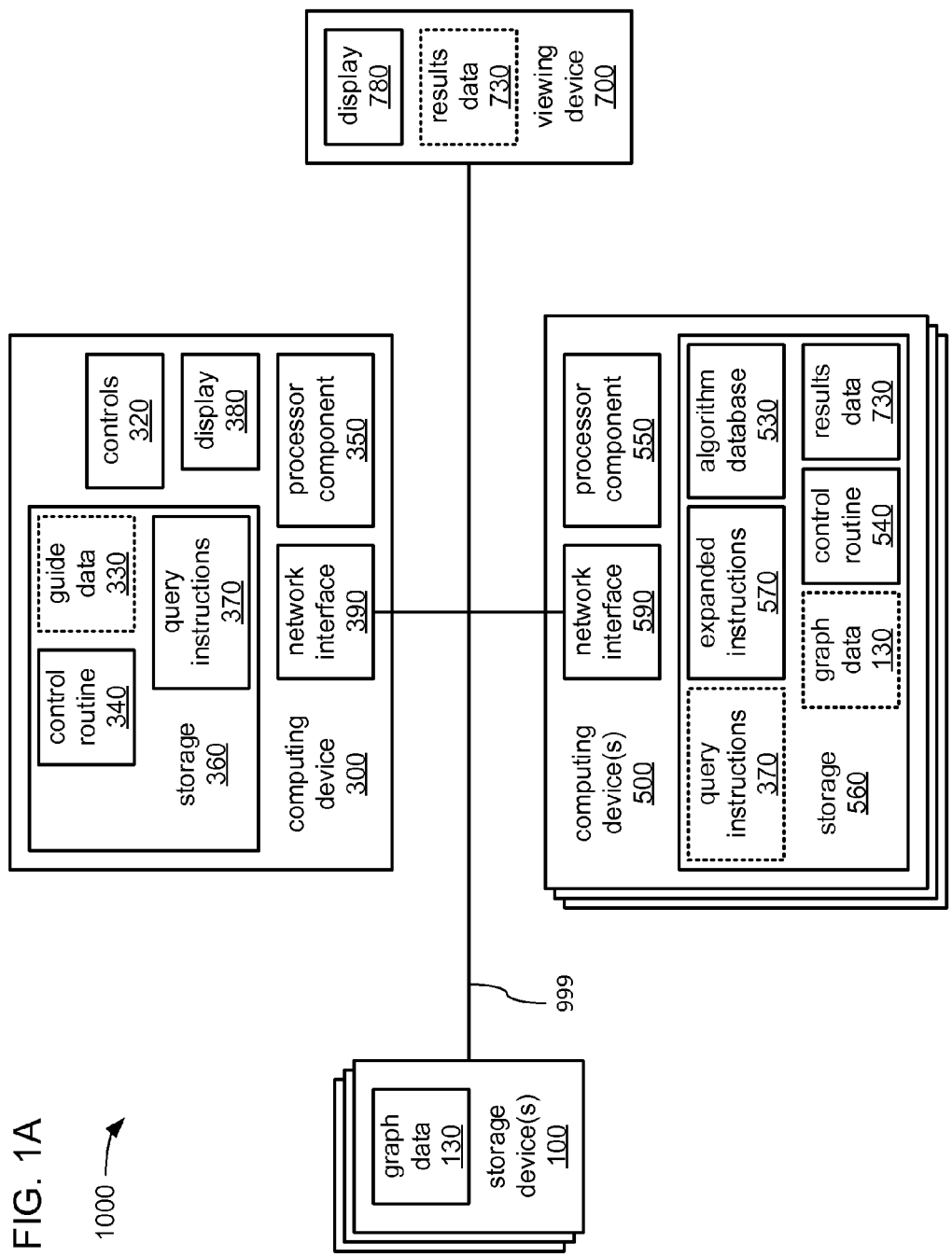
FIG. 1A illustrates an example embodiment of a MILP processing system.

Various embodiments described herein are generally directed to the automated use of graph-based algorithms to solve a MILP problem based on a minimum amount of input that defines the MILP problem as a side-constrained graph problem. More specifically, the MILP problem is decomposed into a master problem and one or more graph subproblems based on its definition as a side-constrained graph problem, and graph-based algorithm(s) are used to solve the one or more subproblems. Query instructions made up of minimal syntax to solve a MILP problem using graph-based algorithms may be received by a computing device either through direct entry of the query instructions by an operator of the computing device or through answers provided by the operator to a series of prompts or questions presented to the operator by the computing device. The computing device enables the operator thereof to model the MILP problem as a side-constrained graph problem such that the amount and/or complexity of the input required from the operator is considerably reduced from input that requires an understanding of the field of MILP problems on the part of the operator to input that is easier for most persons to mentally visualize. Specifically, the operator specifies the graph data associated with nodes and/or the links extending between the nodes of a graph, an objective function, one or more side constraints, an indication of which graph-based algorithm to employ for each subproblem, and a mapping of decision variables to the nodes and/or edges. The MILP problem, as represented as a side-constrained graph problem by the query instructions, is automatically decomposed into a master problem and one or more graph subproblems to which the one or more specified graph-based algorithms are to be applied. In so doing, expanded instructions are automatically generated by the computing device to implement the logic for solving the one or more subproblems using the one or more specified graph-based algorithms. Execution of the expanded instructions causes the performance of multiple iterations of alternating between solving the one or more subproblems and solving the master problem to derive progressively better solutions with each iteration until a solution is derived that optimizes the objective function and that satisfies the one or more side constraints and subproblem constraints.

In using graph-based algorithms, an operator of a computing device is allowed to think of a MILP problem in a visual manner (e.g., as a side-constrained graph problem), which is often a more natural way to understand such complex problems. Further, even for those who have been trained to employ math programming-based algorithms to solve such complex problems, the ability to use graph-based algorithms may still be advantageous since the use of math programming-based algorithms often requires considerably more input and/or input of greater complexity to manually define various mathematical relationships among variables and/or to define the manner in which iterations are to be performed. Stated differently, requiring even a person accustomed to approaching such complex problems using math programming-based algorithms burdens that person with a requirement to provide considerably more input to specify considerably more aspects of the manner in which such problems are to be solved.

For MILP problems that are amenable to being solved via graph-based algorithms, such use of graph-based algorithms may be considerably more efficient than math programming-based algorithms. As familiar to those skilled in the area of MILP problems, the complexity of the instructions that cause a processor component to solve a MILP problem using math programming-based techniques may increase considerably with each variable or side constraint that is added. In contrast, the increase in complexity in instructions that occurs with the addition of each variable or side constraint when using graph-based algorithms is not as great. Thus, the use of graph-based algorithms may greatly reduce storage and/or network bandwidth resources to store and/or exchange instructions to cause a processor component to solve a MILP problem. Further, such use of graph-based algorithms to solve a MILP problem may also result in considerably reduced processing requirements, thereby enabling a MILP problem to be solved in considerably less time. In particular, more efficient use may be made of multiple processor components and/or multi-core processor components in solving multiple subproblems at least partly in parallel by using graph-based algorithms to solve each of those subproblems.

In applying graph-based algorithms to a MILP problem, aspects of the MILP problem are represented with a graph made up of nodes and edges, and data values on which a solution is to be based are associated with the nodes and/or with the edges. Depending on the nature of the problem, the nodes may represent any of a number of items associated with the MILP problem, including and not limited to, genes of a genetic sequence, persons, locations, or devices on a communications network. Correspondingly, the edges may represent any of a number of items or relationships, including and not limited to, observed associations between individual genes, relationships between persons, pathways between locations, or links in a communications network. The data values may be any of a variety of measures and/or quantities associated with each of the nodes and/or edges, including and not limited to, monetary costs, amounts of time, travel distances, or service quality levels. In some embodiments, such data values may be received by a computing device from an operator of the computing device. In other embodiments, such data values may be received from one or more storage devices that may be co-located with the computing device or that may be remotely accessible through a network.

Along with the data values, the computing device is provided with an objective function and one or more side constraints, received, for example, from the operator or from one or more storage devices. The objective function specifies a variable for which a value is to be derived through graph-based algorithm(s) from the provided data values, and specifies whether that value is to be minimized or maximized as part of solving the MILP problem. The one or more side constraints represent one or more limitations imposed by any of a variety of possible circumstances that serve to constrain the variety of feasible solutions that may be derived as part of deriving the optimal value for the specified variable, as set forth by the objective function.

The computing device is also provided with an indication of a mapping of the variables of the objective function and the one or more side constraints to the nodes and/or to the edges in the graph. In this way, the computing device is provided with the information needed to establish the association(s) between the decision variables and the nodes and/or the edges.

The computing device is further provided with an indication of one or more graph-based algorithms to employ. A separate graph-based algorithm may be specified to be applied to each subproblem into which the MILP problem is to subsequently be decomposed. In combination with at least the objective function, the indication of which graph-based algorithm to apply to each subproblem enables the computing device to determine how to use the data values associated with the nodes and/or edges to derive values for the specified variable. Any of a variety of graph-based algorithms may be specified, including and not limited to, graph-based versions of minimum spanning tree (MST), the traveling salesman problem (TSP), the shortest path problem (SP), and/or the cycle detection algorithm.

In some embodiments, the computing device may provide the operator with a user interface by which the operator directly enters the objective function, the one or more side constraints, the mapping, and the indication of which graph-based algorithm is to be applied to each subproblem. In such embodiments, such a user interface may include a display and/or manually-operable controls of the computing device that enable the operator to directly enter query instructions that include expressions conveying such pieces of information (e.g., commands, declarations and/or other instructions). In other embodiments, the computing device may provide the operator with a user interface by which the operator is prompted to provide such pieces of information. In such embodiments, the manner in which the operator does so may be through direct entry of portions of the query instructions in response to such prompting, may be through selecting menu items or may be through a combination of both.

From query instructions that specify the objective function, the one or more side constraints, and the graph-based algorithm to apply to each subproblem, the computing device may automatically decompose the MILP problem into a master problem and the one or more subproblems. In so doing, the computing device may interpret the query instructions to generate expanded instructions that, when executed, cause a processor component to perform iterations of alternating between solving the one or more subproblems using the indicated one or more graph-based algorithms (and using a solution to the master problem), and solving the master problem using solution(s) from the one or more subproblems. In some embodiments, the computing device may execute the expanded instructions to perform such iterations and thereby complete the solving of the MILP problem. In other embodiments, the computing device may distribute the portion of the expanded instructions for solving the master problem and/or the one or more portions of the expanded instructions for solving the one or more subproblems to one or more processor components and/or one or more other computing devices to be executed. In particular, where there are multiple subproblems that are able to be solved independently of each other such that none of the subproblems requires the solution of another subproblem to be solved, portions of the expanded instructions to solve each of the subproblems may be transmitted to one or more other computing devices to be executed at least partly in parallel. However, regardless of whether such distribution of portions of the expanded instructions and/or such parallel execution takes place, iterations are still performed in which there is alternating between solving the master problem and solving the one or more subproblems. Stated differently, while multiple subproblems may be solved at least partly in parallel, the master problem and the one or more subproblems may not be solved in parallel.

The solution to the MILP problem may be visually presented in graphical form and/or may serve as an input to solving another problem. This may entail transmitting an indication and/or a rendered visual representation of the solution to the MILP problem to one or more other computing devices.

With general reference to notations and nomenclature used herein, portions of the detailed description that follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1A illustrates a block diagram of an example embodiment of a MILP processing system 1000 incorporating one or more storage devices 100, a computing device 300, one or more computing devices 500 and/or a viewing device 700. As depicted, these computing devices 100, 300, 500 and 700 may exchange graph data 130 made up of data values to use as an input to solving a MILP problem, query instructions 370 made up of instructions expressing information needed to solve the MILP problem, and/or results data 730 that indicates the solution to the MILP problem through a network 999. However, one or more of the computing devices 100, 300, 500 and/or 700 may exchange other data entirely unrelated to solving MILP problems thereamong or with still other computing devices (not shown) via the network 999. In various embodiments, the network 999 may be a single network that may extend within a single building or other relatively limited area, a combination of connected networks that may extend a considerable distance, and/or may include the Internet. Thus, the network 999 may be based on any of a variety (or combination) of communications technologies by which communications may be effected, including without limitation, wired technologies employing electrically and/or optically conductive cabling, and wireless technologies employing infrared, radio frequency or other forms of wireless transmission.

The MILP problem associated with one or more of the graph data 130, the query instructions 370 and the results data 730 may be any of a variety of types of mathematical problems, including and not limited to, an analysis of observations of a complex system such as associations between genes in a genetic sequence, a logistics problem associated with the operation of a business or other enterprise, an analysis of relationships between persons, or a problem of how to install and/or configure a communications network. The graph data 130 may include data values associated with nodes and/or edges of a graph to be employed with one or more graph-based algorithms to solve one or more subproblems into which the MILP problem is decomposed. In so doing, the graph data 130 defines the graph. The query instructions 370 may include expressions in the form of declarations, commands, and/or other types of instructions written in any of a variety of programming languages or combinations of programming languages that specify what the one or more graph-based algorithms are and a mapping enabling the use of data values of the graph data 130 with those graph-based algorithms to solve the MILP problem. As will be explained in greater detail, such expressions within the query instructions 370 may employ a relatively minimal form of syntax that enables such indications to be conveyed with minimal effort, and using minimal storage space and/or network bandwidth. The results data 730 may include a visual representation of the solution to the MILP problem that may be rendered for visual presentation on a display.

In various embodiments, the computing device 300 incorporates one or more of a processor component 350, a storage 360, manually-operable controls 320, a display 380 and a network interface 390 to couple the computing device 300 to the network 999. The storage 360 may store one or more of a control routine 340, guide data 330 and the query instructions 370. The control routine 340 may incorporate a sequence of instructions operative on the processor component 350 to implement logic to perform various functions.

In executing the control routine 340, the processor component 350 may operate the display 380 and the manually-operable controls 320 to provide a user interface to an operator of the computing device 300 to enable the operator to provide various pieces of information needed to solve a MILP problem. In some embodiments, such a user interface may include a text editor or form of developing environment that enables an operator to directly enter at least a portion of the query instructions 370 to specify the various pieces of information. In such embodiments, the operator may also provide an indication that the graph data 130 stored by the one or more storage devices 100 contains the data values that are to be used as an input to solving the MILP problem, or may directly enter the graph data 130 (e.g., via the controls 320).

In other embodiments, such a user interface may guide an operator in a step-by-step manner with various prompts through the entry of such pieces of information. In such other embodiments, the processor component 350 may retrieve text and/or graphical prompts to use in providing such guidance to an operator from the guide data 330. Alternatively or additionally, the guide data 330 may provide indications of which prompt of multiple prompts to present next in response to a particular piece of information provided by an operator in response to a previously presented prompt. As will be explained in detail, part of the presentation of one or more of the prompts to an operator may entail presenting at least a portion of the graph data 130 to the operator. In support of doing so, the processor component 350 may be caused to operate the network interface 390 to retrieve the graph data 130 from the one or more storage devices 100 via the network 999. This may be done to enable the operator to view data values of the graph data 130 to confirm that the graph data 130 is the correct data to employ as an input to solving a MILP problem. Alternatively, the operator may be prompted to enter the graph data 130 directly (e.g., via the controls 320). The processor component 350 may be caused by execution of the control routine 340 in conjunction with the guide data 330 to use the various pieces of information provided by an operator to the various prompts to automatically generate the query instructions 370, thereby sparing the operator the effort of doing so.

Regardless of whether the query instructions 370 are directly entered by an operator of the computing device 300 or are generated by the processor component 350 from pieces of information needed to solve a MILP problem received by the computing device 300 from the operator, the processor component 350 may be caused to operate the network interface 390 to transmit the query instructions 370 to the one or more computing devices 500 via the network 999. Further, where the graph data 130 is received by the computing device 300 from the operator, the processor component 350 may also operate the network interface 390 to transmit the graph data 130 to the one or more computing devices 500 via the network 999. Otherwise, the one or more computing devices 500 may retrieve the graph data 130 from the one or more storage devices 100 as part of solving the MILP problem.

In various embodiments, each of the one or more computing devices 500 incorporates one or more of a processor component 550, a storage 560 and a network interface 590 to couple each of the one or more computing devices 500 to the network 999. The storage 560 may store one or more of the graph data 130, the query instructions 370, a control routine 540, expanded instructions 570 and the results data 730. The control routine 540 may incorporate a sequence of instructions operative on the processor component 550 to implement logic to perform various functions.

In executing the control routine 540, the processor component 550 of one of the one or more computing devices 500 may operate the network interface 590 to receive at least the graph data 130 from the one or more storage devices 100 and to receive the query instructions 370 from the computing device 300. In further executing the control routine 540, the processor component 550 of that one of the one or more computing devices 500 may interpret at least the expressions within the query instructions 370 that convey the objective function, the one or more side constraints, the mapping of variables to nodes and/or edges of a graph, and the specification of one or more graph-based algorithms, as well as the description of a graph provided by the graph data 130, to retrieve enough information about the MILP problem from the query instructions 370 and the graph data 130 to decompose the MILP problem into a master problem and one or more subproblems using Dantzig-Wolfe decomposition, Benders decomposition or another form of decomposition. In so doing, the processor component 550 of that one of the one or more computing devices 500 may generate the expanded instructions 570 to include instructions executable by one or more processor components to solve each of the master problem and the one or more subproblems. The processor component 550 of that one of the one or more computing devices 500 may then store the expanded instructions 570 within its associated storage 560 for subsequent retrieval and execution to subsequently perform the iterations of solving the master problem and the one or more subproblems of the MILP problem.

In a subsequent execution the control routine 540, the processor component 550 of one of the one or more computing devices 500 may be caused to execute the expanded instructions 570 in embodiments in which only one of the one or more computing devices 500 is to be employed in solving the MILP problem. However, in embodiments in which more than one of the computing devices 500 is to be employed in solving the MILP problem, the processor component 550 of that one of the computing devices 500 may distribute at least a portion of the expanded instructions 570 among one or more others of the computing devices 500 to enable the processor component(s) 550 thereof to each to execute at least that portion. By way of example, where the MILP problem is decomposed into a master problem and multiple subproblems that have no dependencies thereamong as a result of none of the subproblems requiring the solution of any of the other subproblems to be solved, then portion of the expanded instructions 570 made up of instructions to solve one or more of the subproblems may be so distributed to enable the processor component(s) 550 of each of multiple ones of the computing devices 500 to solve a different one of the subproblems at least partly in parallel with other(s) of the computing devices 500.

Regardless of whether the MILP problem is decomposed into one or more than one subproblem, as previously discussed, solving the MILP problem entails multiple iterations of alternating between solving the one or more subproblems and solving the master problem to derive progressively better solutions to minimize or maximize the value of a variable specified by the objective function to be so minimized or maximized. In each such iteration where there is more than one subproblem to be solved and those subproblems are able to be solved independently of each other, then multiple ones of the computing devices 500 may be employed to solve each of such multiple subproblems at least partly in parallel during each iteration. Alternatively or additionally, where the processor component 550 of one or more of the computing devices 500 incorporates multiple processing cores or another mechanism that enables multiple simultaneous threads of execution, then multiple subproblems may be solved at least partly in parallel during each such iteration using such multiple threads of execution of one of the processor components 550.

In executing the expanded instructions 570, if the graph data 130 was not previously received from the computing device 300 along with the query instructions 370, then the processor component 550 of one or more of the computing devices 500 may operate associated one(s) of the network interface 590 to retrieve the graph data 130 from the one or more storage devices 100 via the network 999. Upon solving the MILP problem, the processor component 550 of one of the one or more computing devices 500 may store an indication of the solution within its associated storage 560 as the results data 730. The processor component 550 of that one of the one or more computing devices 500 may then operate its associated network interface 590 to transmit the results data 730 to one or more other computing devices, such as the computing device 300 or the viewing device 700.

In some embodiments, the processor component 550 of at least one of the one or more computing devices 500 may generate a visualization of the solution to the MILP problem and may include that visualization in the results data 730. In other embodiments, such a visualization may be generated by one or more computing devices that receive the results data 730. By way of example, the viewing device 700 may generate such a visualization from the results data 730 and may present that visualization on a display 780 of the viewing device 700. Alternatively or additionally, the processor component 350 of the computing device 300 may generate such a visualization and may present that visualization on the display 380.

Figure 1B:
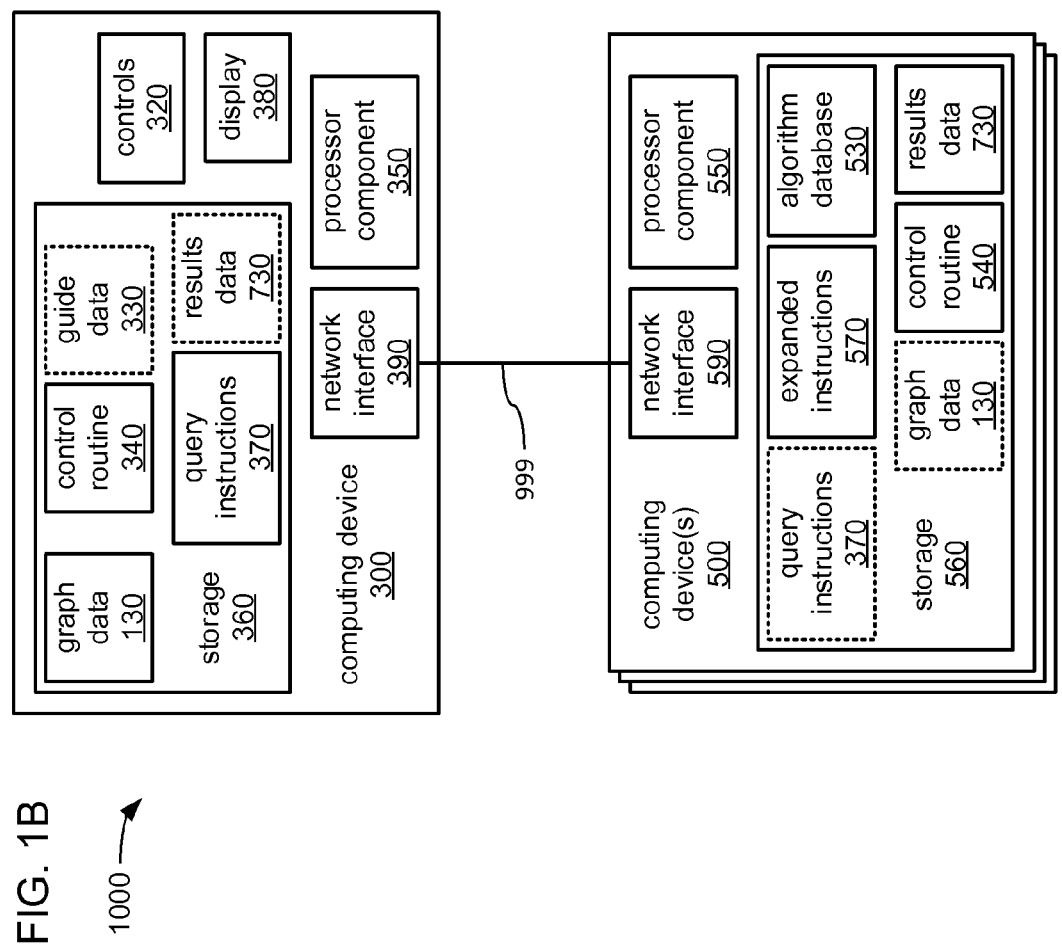
FIG. 1B illustrates an alternate example embodiment of a MILP processing system.

FIG. 1B illustrates a block diagram of an alternate example embodiment of the MILP processing system 1000 featuring an alternate embodiment of the computing device 300 or an alternate embodiment of the one or more computing devices 500 storing the graph data 130 in lieu of the one or more storage devices 100 of FIG. 1A doing so. Thus, in FIG. 1B, such an alternate embodiment of the computing device 300 may provide the graph data 130 to the one or more computing devices 500 to use in solving a MILP problem regardless of whether the graph data 130 was earlier stored within the storage 360 of the computing device 300 or received from an operator of the computing device 300. Alternatively, in FIG. 1B, such an alternate embodiment of the one or more computing devices 500 may already store the graph data 130 within the storage(s) 560 of the one or more computing devices 500 such that retrieval from other device(s) is unnecessary and/or such that the one or more computing devices 500 may provide the graph data 130 to the computing device 300 to present on the display 380 to an operator of the computing device 300.

Figure 2:
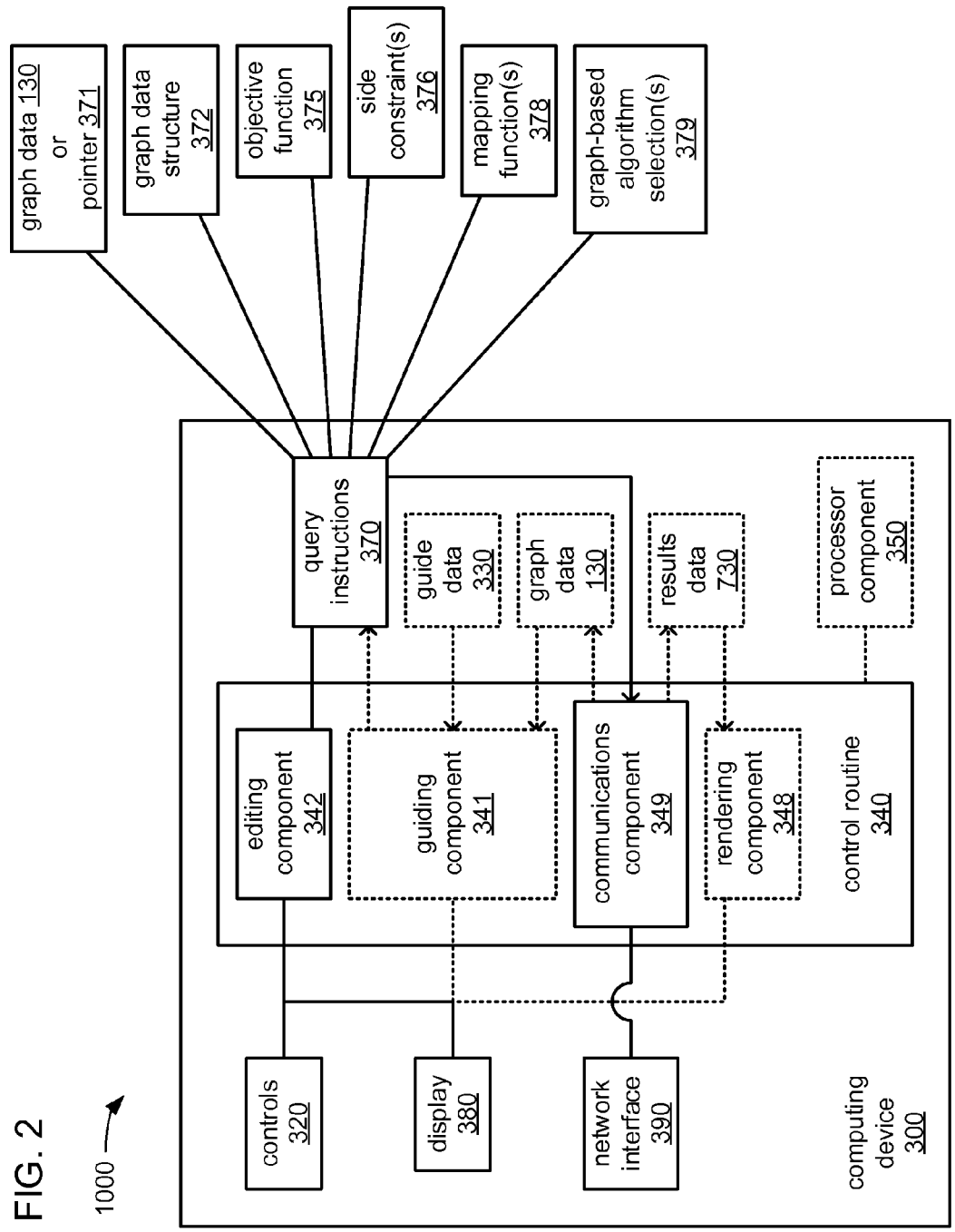
FIG. 2 illustrates an example of an operating environment for a portion of a MILP processing system.

FIG. 2 illustrates a block diagram of a portion of an embodiment of the MILP processing system 1000. More specifically, FIG. 2 depicts aspects of the operating environment of an embodiment of the computing device 300 in which the processor component 350, in executing the control routine 340, may operate the controls 320 and/or the display 380 to provide a user interface to an operator of the computing device 300 by which the computing device 300 receives various pieces of information required to solve a MILP problem. As has been discussed, such information may be received as result of the operator directly entering at least the portion of the query instructions 370 that is made of up expressions in the form of command instructions, declaration instructions and/or other instructions that convey such information. However, as has also been discussed, the computing device 300 may prompt the operator through entering each of the pieces of such information need to solve the MILP problem.

The control routine 340, including the components of which it is composed, are selected to be operative on whatever type of processor or processors that are selected to implement the processor component 350. In various embodiments, the control routine 340 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processor component 350. Where one or more device drivers are included, those device drivers may provide support for any of a variety of other components, whether hardware or software components, of the computing device 300.

The control routine 340 may include a communications component 349 executable by the processor component 350 to operate the network interface 390 to exchange communications via the network 999 as has been described. Among such communications may be those conveying the graph data 130, the query instructions 370 and/or the results data 730 among the computing devices 100, 300, 500 and/or 700 via the network 999. The communications component 349 may be selected to be operable with whatever type of interface technology is selected to implement the network interface 390.

The control routine 340 may include an editing component 342 executable by the processor component 350 to operate the controls 320 and the display 380 to provide an operator of the computing device 300 with a user interface made up of a text entry and editing environment by which the operator may directly enter at least a portion of the query instructions 370 expressing the information needed to solve a MILP problem. By way of example, where the MILP problem to be solved is a side-constrained shortest path (SP) problem, the editing component 342 may enable the computing device 300 to receive the direct entry of the following example of both the graph data 130 and the query instructions 370:

Example of Graph Data 130 and Query Instructions 370 for a SP Example

```
data arc_data;
   input i j cost time;
   datalines;
1 2  1 10
1 3 10  3
2 4  1  1
2 5  2  3
3 2  1  2
3 4  5  7
3 5 12  3
4 5 10  1
4 6  1  7
5 6  2  2
;
%let source   = 1;
%let sink     = 6;
%let max_time = 14;
proc optmodel;
   set <num,num> ARCS;
   num cost [ARCS];
   num time [ARCS];
   read data arc_data into ARCS=[i j] cost time;
   set NODES = union [<i,j> in ARCS] [i,j];
   num source    = &source;
   num sink      = &sink;
   num max_time  = &max_time;
   var Flow (ARCS) binary;
   min TotalCost =
      sum {<i,j> in ARCS} cost[i,j] * Flow[i,j];
   con Side_con:
      sum [<i,j> in ARCS] time[i,j] * Flow[i,j] <= max_time;
   /* solve using decomp, with network (SHORTPATH) subproblem */
```

Example of Graph Data 130 and Query Instructions 370
for a SP Example

```
con Balance:
    path (Flow, source, sink, graph_direction=directed);
    Balance.block = 0;
    for (<i,j> in ARCS) do;
        Flow[i,j].from    = i;
        Flow[i,j].to      = j;
    end;
    solve with MILP / decomp;
quit;
```

In this SP example, the query instructions 370 are written in the SAS programming language promulgated by SAS Institute Inc. of Cary, N.C., in the United States. However, it should be noted that other embodiments are possible in which the query instructions 370 may be written in any of a variety of other programming languages or combinations of programming languages. In this SP example, the data values of the graph data 130 are embedded within the query instructions 370 via the Data Step of the SAS Language, using the "data arc_data;" and "datalines" statements, along with the depicted rows of numerical values. Following the embedded data values of the graph data 130 are declarations of various constants, including those indicating the starting and ending nodes (e.g., the "source" and the "sink") between which the shortest path is to be found. Also, in this SP example, the ones of the query instructions 370 expressing the information needed to solve this example SP problem are set forth following the "proc optmodel;" procedure statement. Although this SP example is presented with the graph data 130 embedded within the query instructions 370, the editing component 342 may alternatively enable the operator of the computing device 300 to supply an indication of where the graph data 130 may be retrieved (e.g., a pointer to the graph data 130 as a separate data structure or a network address enabling the retrieval of the graph data 130 from the one or more storage devices 130). Alternatively, the editing component 342 may simply enable the operator to include instructions to access and retrieve the graph data 130 as part of the query instructions 370.

Figure 3A:
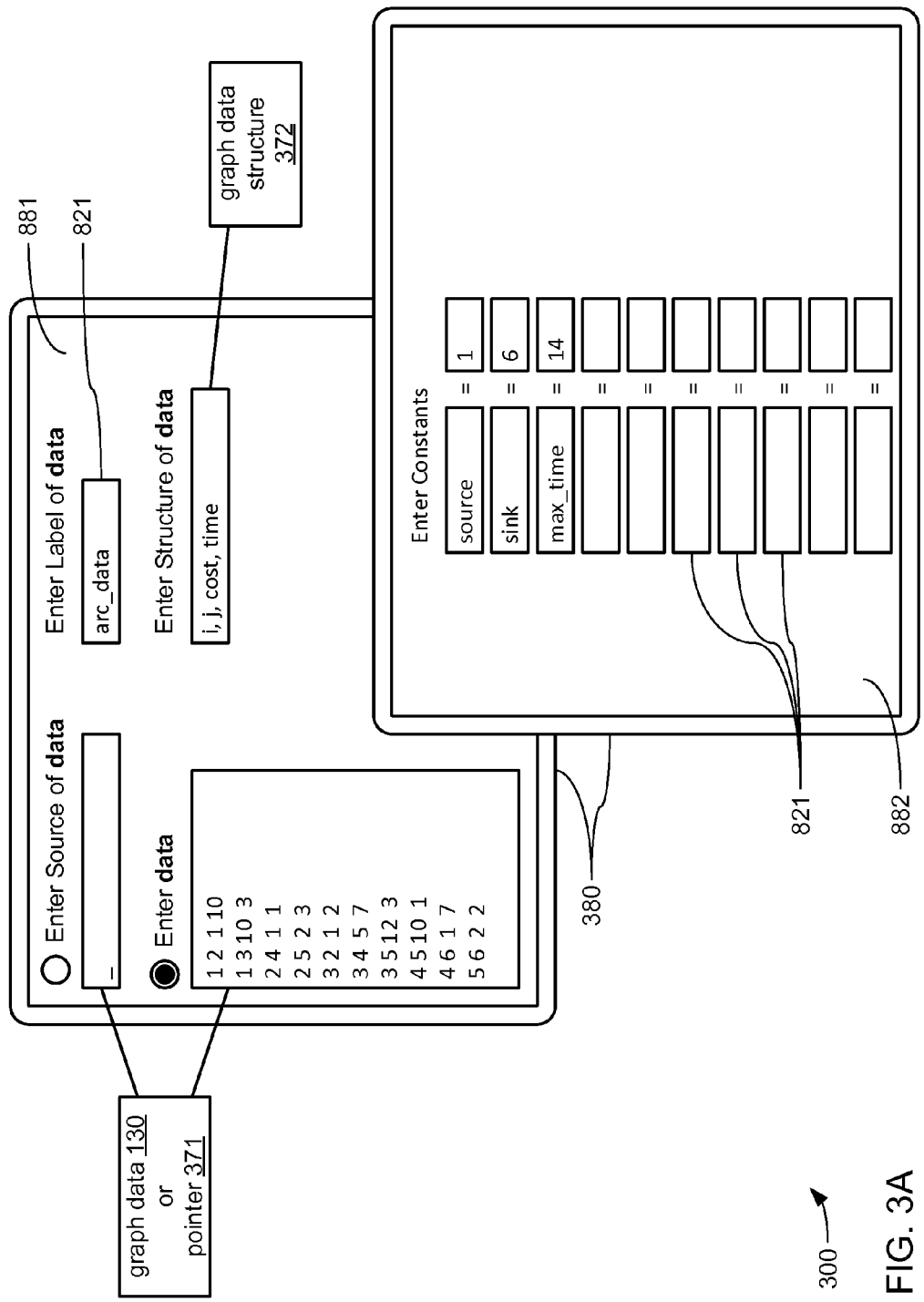
FIGS. 3A, 3B and 3C, together, illustrate an example of prompting an operator of a computing device to provide information needed to solve a MILP problem.
Figure 3B:
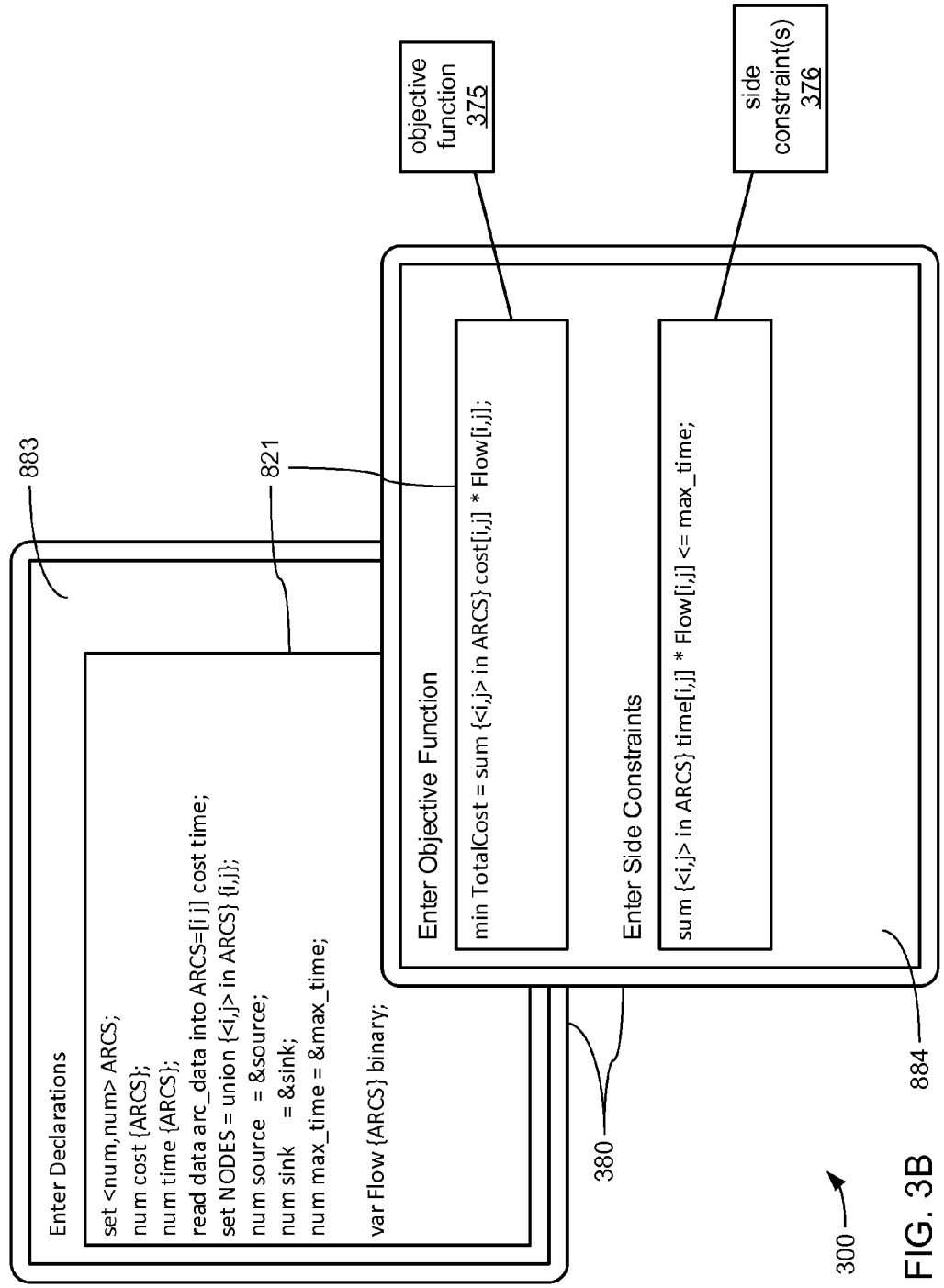
Figure 3C:
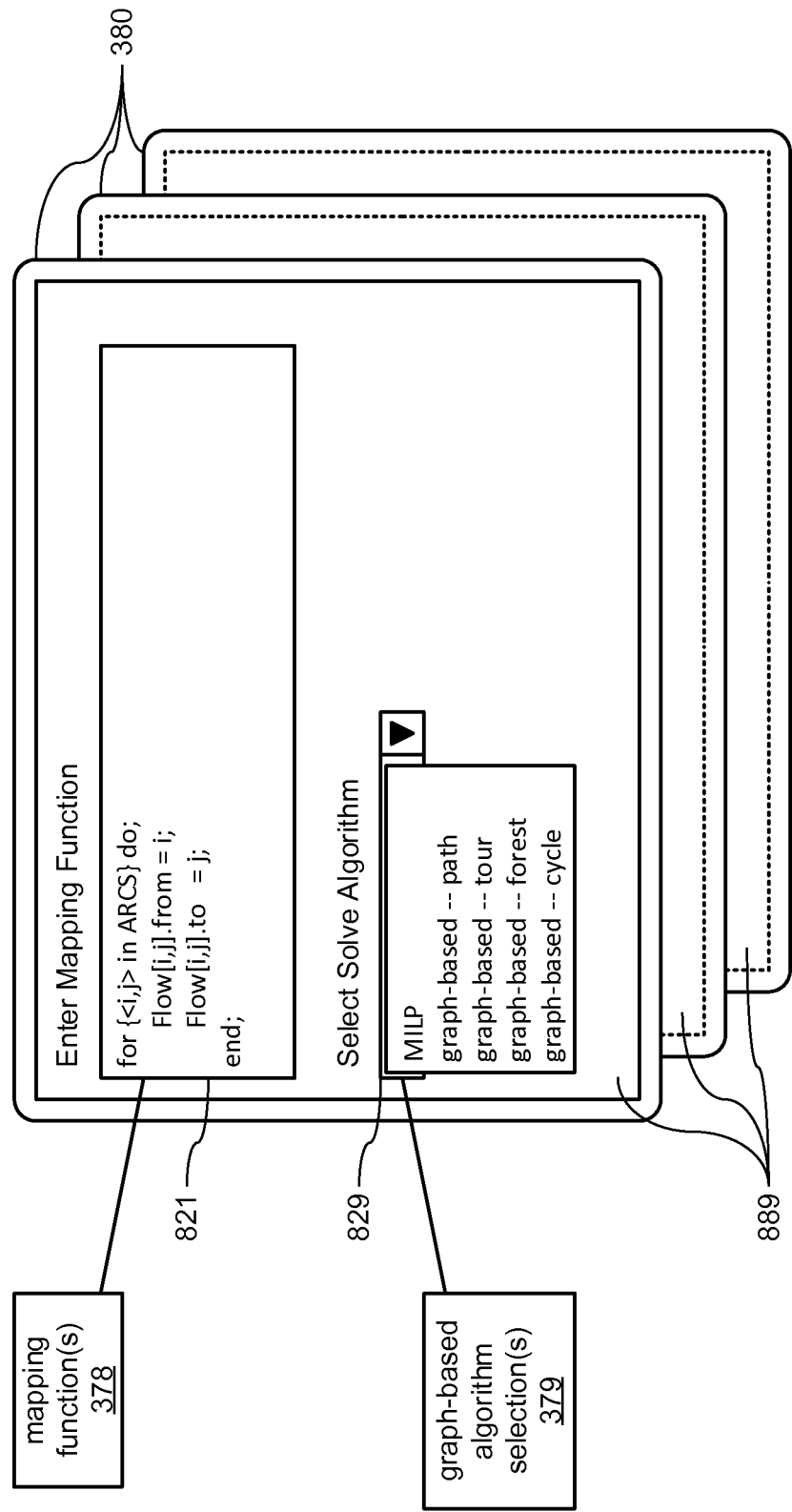

As an alternative to or in addition to the editing component 342, the control routine 340 may include a guiding component 341 executable by the processor component 350 to operate the controls 320 and the display 380 to provide an operator of the computing device 300 with a user interface made up of prompts presented on the display 380 to enter pieces of the information needed to solve a MILP problem. FIGS. 3A, 3B and 3C depict a series of examples of such prompts presented on the display 380.

Turning to FIG. 3A, a prompt 881 may be presented on the display 380 to request an operator of the computing device 300 to either directly enter the graph data 130 or a pointer 371 to where the graph data 130 may be retrieved (e.g., either an address pointer to where the graph data 130 is located within the storage 360 or a network address pointing to the one or more storage devices 160). The prompt 881 may also request that the operator enter a label by which the data values of the graph data 130 are referenced from within the query instructions 370 (e.g., the depicted label "arc_data"). The prompt 881 may further request that the operator enter indications of a graph data structure 372 of the graph data 130, where the graph data structure 372 specifies the labels given to each of the data values associated with each node and/or associated with each edge of a graph, as well as the manner in which those data values are organized to enable their retrieval and use by the query instructions 370 to solve the MILP. As also depicted in FIG. 3A, another prompt 882 may be presented on the display 380 to request that the operator enter the labels and values of any constants to be employed by the query instructions 370 (e.g., the label "max_time" specifying a constant maximum measure of time, and the labels "source" and "sink" specifying the constants identifying the starting and ending nodes between which the shortest path is to be found).

Turning to FIG. 3B, a prompt 883 may be presented on the display 380 to request that the operator enter any declarations of variables and their data types, including any indices that may be employed in accessing elements of an array, such as the array "ARCS" made up of entries for "cost" and "time" data values of the graph data 130 that are indexed by the "i" and "j" data values that numerically identify the nodes at the start and end of each of multiple edges. As also depicted in FIG. 3B, another prompt 884 may be presented on the display 380 to request that the operator enter an objective function 375 and any side constraints 376 that define the MILP problem to be solved. In this SP example, the objective function 375 specifies the value of the variable "TotalCost" made up of a sum of one or more "cost" data values associated with each of the edges identified by an associated pair of "i" and "j" data values is to be minimized. However, the objective function 375 is accompanied by a side constraint 376 specifying the sum of the one or more "time" data values that are associated with the ones of the "cost" data values included in the sum for the variable "TotalCost" can be no greater than the constant "max_time" specified earlier.

Turning to FIG. 3C, a separate prompt 889 corresponding to each subproblem into which the MILP problem is to be decomposed may be presented on the display 380 to request that the operator make a graph-based algorithm selection 379 that specifies the graph-based algorithm to be applied to that subproblem. As depicted, in some embodiments, the graph-based algorithm selection 379 may be made from a listing of multiple graph-based algorithms presented in a drop-down menu (or other form of menu), and such a menu may include the option of applying a math programming-based algorithm (indicated as "MILP") in lieu of any graph-based algorithm. For this SP example, the graph-based algorithm that is selected may be the one designated by the "path" predicate that returns an indication of true or false depending on whether or not a solution is found. The selection of a specific graph-based algorithm to apply to solving a subproblem, may provide an indication of various configuration selections, including an indication of whether a data value associated with an edge applies regardless of the direction in which the edge is traversed (e.g., an undirected data value) or applies only when the edge is traversed in one of the two possible directions (e.g., a directed data value).

For each subproblem into which the MILP problem is to be decomposed the associated prompt 889 may also request that the operator enter a mapping function 378 that defines a mapping between the nodes and/or edges used by the selected graph-based algorithm and one or more of the variables of the objective function 375 and/or the one or more side constraints 376. As depicted, the mapping function 378 may define a manner of progressing through the data values of the graph data 130 associated with the nodes and/or the edges of a graph, such as the depicted "for" loop that causes the evaluation of solutions to the subproblem to progress through the "cost" and "time" values associated with each edge and indexed through the set "ARCS" by the "i" and "j" values identifying the nodes at each end of each of those edges. In so doing for each such edge, the ".from" and ".to" suffixes specify which of the two nodes for each of those edges is the starting node and which is the ending node in a one-way direction of travel along that edge.

It should be noted that this SP example is a relatively simple example provided herein for sake of illustration and understanding, and should not be taken as providing an indication that what is described and taught herein is not applicable to far more complex MILP problems. By way of example, it is to be understood that what is described and taught herein may be applied to a far more complex example of a SP problem in which there are far more nodes and edges, and in which there may be numerous side constraints. Despite the relative simplicity of this SP example, it can still be appreciated that enabling the example SP problem to be treated as a side-constrained graph problem, instead of a MILP problem, is easier to understand without the same relatively demanding level of training required to understand MILP problems, and enables the information needed to solve the SP problem to be presented to the computing device 300 in a simpler form. To further exemplify these points with regard to this example SP problem, an example of the information that would be needed to solve this example SP problem while treating it as a MILP problem in accordance with the prior art is provided below:

---

PRIOR ART Example of Instructions to Solve a SP Example as a MILP Problem

```
proc optmodel;
    set <num,num> ARCS;
    num cost {ARCS};
    num time {ARCS};
    read data arc_data into ARCS=[i j] cost time;
    set NODES = union (<i,j> in ARCS) [i,j];
    num source    = &source;
    num sink      = &sink;
    num max_time  = &max_time;
    var Flow {ARCS} binary;
    min TotalCost =
        sum (<i,j> in ARCS) cost[i,j] * Flow[i,j];
    con Side_con:
        sum(<i,j> in ARCS) time[i,j] * Flow[i,j] <= max_time;
    /* explicitly declare flow balance constraints */
    con Balance {i in NODES}:
        sum (<(i),j> in ARCS) Flow[i,j]
        - sum (<j,(i)> in ARCS) Flow[j,i]
        = (if i = source then 1 else if i = sink then -1 else 0);
    /* solve using decomp, with LP subproblem */
    for {i in NODES} Balance[i].block = 0;
    solve with MILP / decomp;
quit;
```

---

The instructions in this PRIOR ART example are also written in the SAS programming language promulgated by SAS Institute Inc. In this PRIOR ART example, it can be seen that an additional mathematical relationship for flow balance must be explicitly expressed. Knowing that this needs to be done for this PRIOR ART example requires some degree of understanding of math programming-based algorithms in the field of MILP problems on the part of an operator of the computing device 300, and places an additional burden on that operator.

Below is presented another example of the manner in which the amount and complexity of what may must be expressed in the query instructions 370 may be reduced is presented in the following relatively simple example for a side-constrained minimum spanning tree (MST) problem:

---

Example of Graph Data 130 and Query Instructions 370 for a MST Example

```
data LinkSetIn;
    input from $ to $ weight @@;
    datalines;
A B  7 A D  5 B C 8  B D 9  B E 7
C E  5 D E 15 D F 6  E F 8  E G 9
F G 11 H I  1 I J 3  H J 2
;
data max_degree_data;
    input node $ max_degree;
    datalines;
E 2
;
proc optmodel;
    set <str,str> EDGES;
    num weight {EDGES};
    read data LinkSetIn into EDGES=[from to] weight;
    set NODES = union {<i,j> in EDGES} [i,j];
    num max_degree {NODES} init .;
    read data max_degree_data into [node] max_degree;
    var UseEdge {EDGES} binary;
    min TotalWeight = sum (<i,j> in EDGES) weight[i,j] * UseEdge[i,j];
    con DegreeCon {i in NODES: max_degree(i) ne .}:
        sum (<u,v> in EDGES: i in [u,v]) UseEdge [u,v] <= max_degree[i];
    /* solve using decomp, with network (MST) suproblem */
    con ForestCon:
        forest({<i,j> in EDGES} UseEdge[i,j]);
    ForestCon.block = 0;
    num id init 0;
    num node_id {NODES};
    for (i in NODES) do;
        node_id(i) = id;
        id = id + 1;
    end;
    for (<i,j> in EDGES) do;
        UseEdge[i,j].from = node_id[i];
        UseEdge[i,j].to   = node_id[j];
    end;
    solve with MILP / decomp;
quit;
```

---

In this MST example, the objective function 375 is specified as minimizing the value of the variable "TotalWeight" which is specified as the sum of the "weight" data values associated with one or more edges that are extending between pairs of nodes identified with string values for the variables "i" and "j" from the data values of the graph data 130. A single side constraint 376 indirectly specifies that the maximum degree of connectivity for the node designated as node "E" is 2 via a reference in the "con DegreeCon" statement to the "max_degree_data" of the graph data 130 where this one limit for the node "E" is expressed. With relatively little else needing to be specified in the query instructions 370 for this MST example, the "forest" graph-based algorithm is specified to proceed through each of the edges identified in the "LinkSetIn" portion of the of the graph data 130 to derive a combination of those edges that may be used to span all of the nodes while minimizing the sum of the "weight" data values making up the "TotalWeight", and while meeting the single side constraint associated with the node "E".

The relatively minimal syntax of the query instructions 370 expressing a relatively minimal amount of information needed to solve this MST example contrasts with the greater amount of information required in the below PRIOR ART example of instructions to solve this same side-constrained MST problem as a MILP problem:

PRIOR ART Example of Instructions to Solve a
MST Example as a MILP Problem

```
proc optmodel;
    set <str,str> EDGES;
    num weight (EDGES);
    read data LinkSetIn into EDGES=[from to] weight;
    set NODES = union (<i,j> in EDGES) [i,j];
    num max_degree [NODES] init .;
    read data max_degree_data into [node] max_degree;
    var UseEdge (EDGES) binary;
    min TotalWeight = sum (<i,j> in EDGES) weight[i,j] * UseEdge[i,j];
    con DegreeCon {i in NODES: max_degree[i] ne .}:
        sum [<u,v> in EDGES: i in [u,v]] UseEdge[u,v] <= max_degree [i];
    /* find connected components, and explicitly declare flow balance
        constraints for each connected component */
    num component {NODES};
    solve with network / concomp nodes=(include=NODES)
        links=(include=EDGES) out=(concomp=component);
    set COMPONENTS = setof (i in NODES| component[i];
    set NODES_c {c in COMPONENTS} = {i in NODES:
        components(i) = c};
    str source (COMPONENTS);
    for (c in COMPONENTS) do;
        for (i in NODES_c[c]) do;
            source(c) = i;
            leave;
        end;
    end;
    set ARCS = union (<i,j> in EDGES) (<i,j>,<j,i>);
    set COMMODITIES (c in COMPONENTS) = NODES_c(c) diff
        (source[c]);
    var Flow {c in COMPONENTS, ARCS, COMMODITIES[c]) >=
        0 <= 1;
    con Link {c in COMPONENTS, <i,j> in EDGES, k in
        COMMODITIES[c]}:
        Flow[c,i,j,k] + Flow[c,j,i,k] <= UseEdge(i,j);
    con FlowBalance {c in COMPONENTS, i in NODES_c[c], k in
        COMMODITIES[c]]:
        sum (<(i),j> in ARCS) Flow[c,i,j,k] -
        sum (<j,(i)> in ARCS) Flow[c,j,i,k]
        = (if i = source[c] then 1 else if i = k then -1 else 0);
    /* solve using decomp, with MILP subproblem */
    for (c in COMPONENTS, <i,j> in EDGES, k in COMMODITIES[c])
        Link[c,i,j,k].block = c;
    for [c in COMPONENTS, i in NODES_c[c], k in COMMODITIES[c])
        FlowBalance(c,i,k).block = c;
    solve with MILP / decomp;
quit;
```

In particular, in the instructions in this PRIOR ART example, it can be seen that an additional preprocessing step must be performed, and numerous auxiliary variables and constraints must be expressed in preparation for invoking the use of a math programming-based algorithm to derive a solution. Again, knowing that there is a need to include such additional processing and to set forth such additional variables and constraints requires a great degree of understanding of the field of MILP problems.

Returning to FIG. 2, the control routine 340 may include a rendering component 348 executable by the processor component 350 to operate the display 380 to present a visualization of the solution of a MILP problem as indicated in the results data 730 received from one of the one or more computing devices 500. In some embodiments, the results data 730 may indicate the solution of a MILP problem in a manner that does not include a visualization, and the rendering component 348 may employ that indication in generating a visualization to present on the display 380. In other embodiments, the results data 730 may include a visualization already generated by at least one of the one or more computing devices 500, and the rendering component 348 may present that visualization on the display 380 either with or without modification (e.g., resizing, a change of coloring, etc.).

Figure 4:
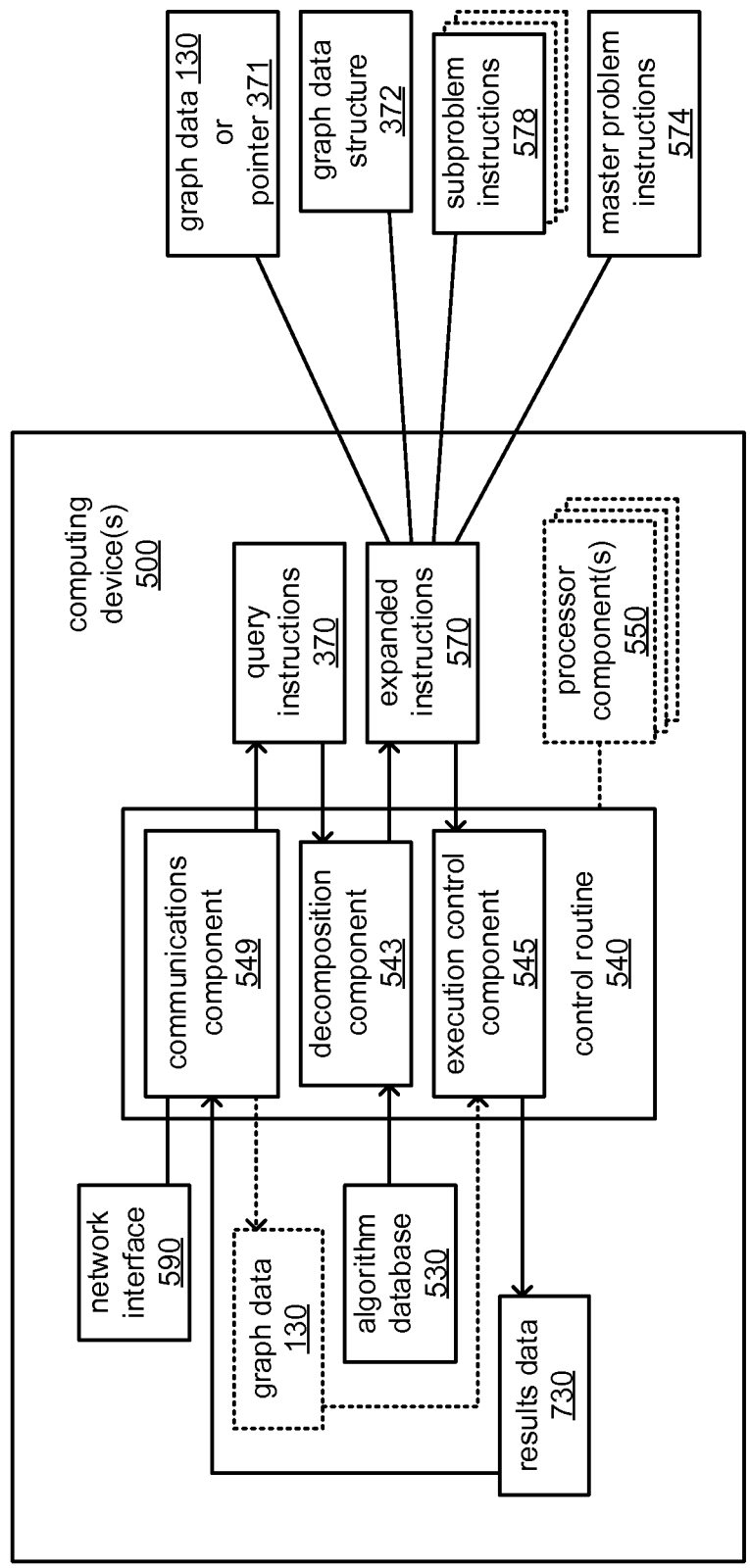
FIG. 4 illustrates an example of an operating environment for another portion of a MILP processing system.

FIG. 4 illustrates a block diagram of a portion of an embodiment of the MILP processing system 1000. More specifically, FIG. 4 depicts aspects of the operating environment of an embodiment of one of the computing devices 500 in which the processor component 550, in executing the control routine 540, may interpret the query instructions 370 to generate the expanded instructions 570 in which a MILP problem treated as a side-constrained graph problem in the query instructions 370 is decomposed into a master problem and one or more subproblems. FIG. 4 also depicts aspects of the processor component 550 of at least one of the computing devices 500 executing the expanded instructions 570 to solve the master problem and the one or more subproblems following decomposition.

The control routine 540, including the components of which it is composed, are selected to be operative on whatever type of processor or processors that are selected to implement the processor component 550 of each of the one or more computing devices 500. As with the control routine 340, in various embodiments, the control routine 540 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processor component 550. Where one or more device drivers are included, those device drivers may provide support for any of a variety of other components, whether hardware or software components, of each of the computing devices 500.

The control routine 540 may include a communications component 549 executable by the processor component 550 to operate the network interface 590 to exchange communications via the network 999 as has been described. Among such communications may be those conveying the graph data 130, the query instructions 370 and/or the results data 730 among the computing devices 100, 300, 500 and/or 700 via the network 999. The communications component 549 may be selected to be operable with whatever type of interface technology is selected to implement the network interface 590.

The control routine 540 may include a decomposition component 543 executable by the processor component 550 of at least one of the one or more computing devices 500 to interpret the query instructions 370 to retrieve pieces of information therefrom to solve a MILP problem, to decompose the MILP problem and to generate the expanded instructions 570 to include executable instructions to solve the master problem and the one or more subproblems generated by the decomposition to complete the solving of the MILP problem. More specifically, the decomposition component 543 retrieves indications of at least a pointer to the graph data 130 (or the graph data 130, itself), the graph data structure 372, the objective function 375, one or more side constraints 376, one or more mapping functions 378 and one or more graph-based algorithm selections 379.

Figure 5:
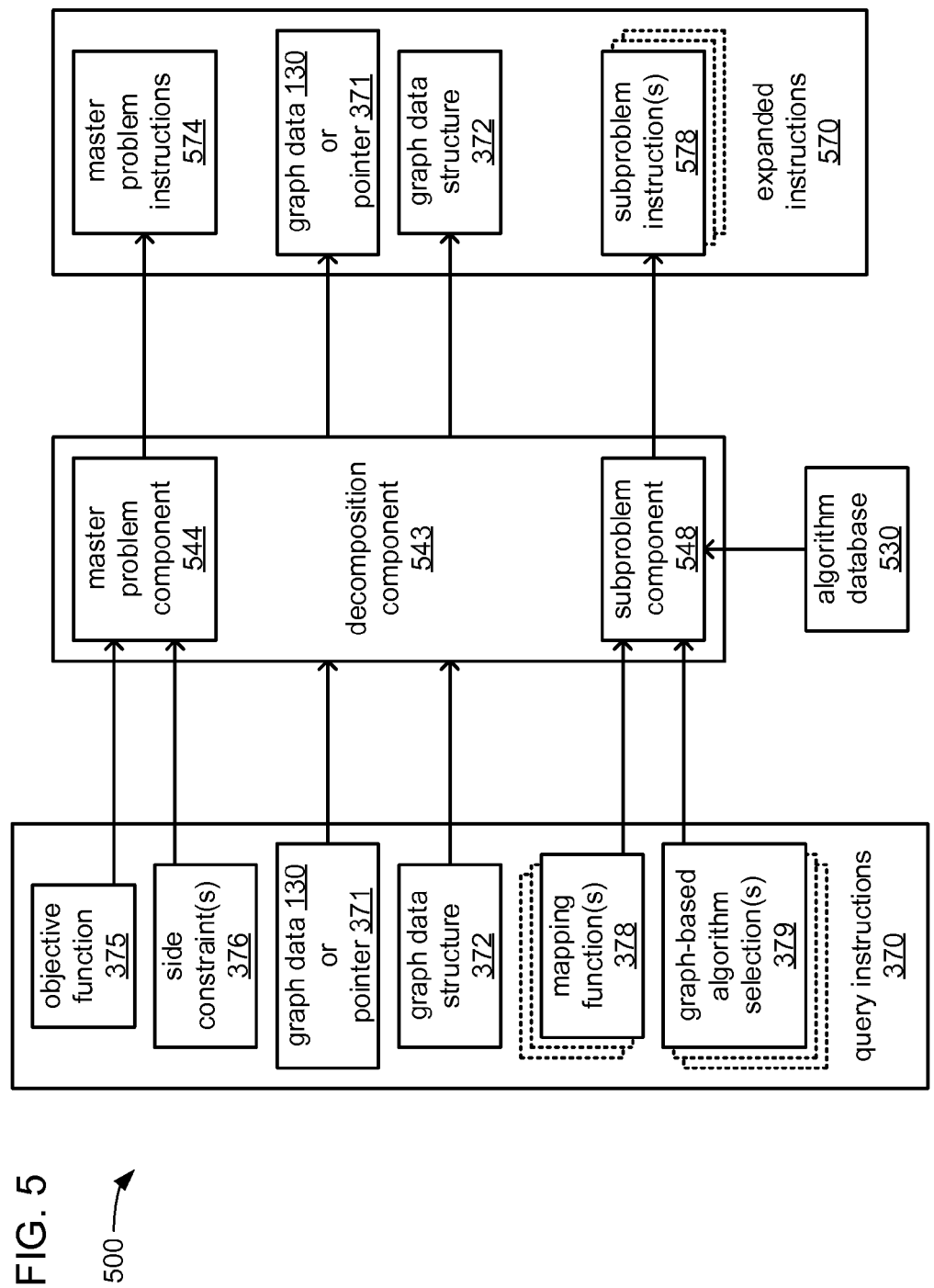
FIGS. 5, 6 and 7, together, illustrate an example of decomposing a MILP problem expressed as a side-constrained graph problem.

Following the retrieval of such pieces of information, the decomposition component 543 may apply Dantzig-Wolfe decomposition, Benders decomposition or another form of decomposition also known to those skilled in the field of MILP problems to the MILP problem that is expressed in the query instructions 370 as a side-constrained graph problem to decompose the MILP problem into a master problem and one or more subproblems that are each to be solved using a graph-based algorithm. More specifically, and as depicted in FIG. 5, the decomposition component 543 may include a master problem component 544 that interprets the objective function 375 and the one or more side constraints 376 as expressed in the query instructions 370 as part of generating master problem instructions 574 within the expanded instructions 570 that are executable by the processor component 550 of at least one of the computing devices 500 to solve the master problem. As also depicted in FIG. 5, the decomposition component 543 may also include a subproblem component 548 that interprets the one or more mapping functions 378 and the one or more graph-based algorithm selections 379 as expressed in the query instructions 370 as part of generating corresponding one or more subproblem instructions 578 that are executed by the processor component 550 of at least one of the computing devices 500 to solve the corresponding one or more subproblems.

Figure 6:
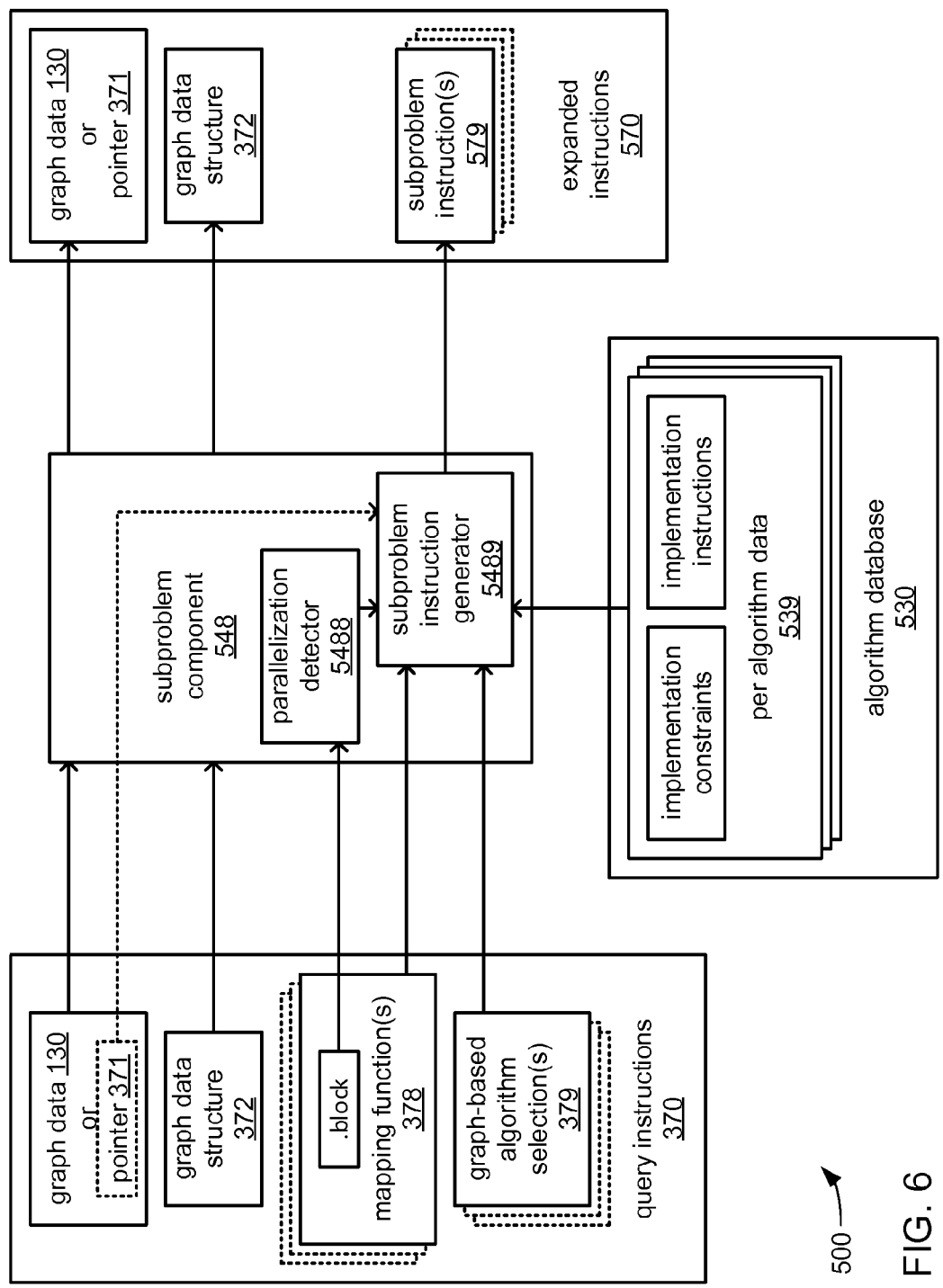

Turning to FIG. 6, the subproblem component 548 may, in turn, include a subproblem instruction generator 5489 to perform the work of generating the one or more subproblem instructions 579 within the expanded instructions 570 for solving the corresponding one or more subproblems. In so doing, the subproblem instruction generator 5489 may embed the pointer 371 to the graph data 130 or at least a portion of the graph data 130, itself, into one or more of the subproblem instructions 579. In some embodiments, the subproblem instruction generator 5489 may retrieve from the algorithm database 530 implementation instructions from which to generate an appropriate set of the subproblem instructions 579 for each one of the graph-based algorithms that are selected to be applied to a subproblem. In such embodiments, the algorithm database 530 may contain multiple sets of per algorithm data 539 in which each piece of per algorithm data 539 includes a set of instructions specifically generated to implement a corresponding specific graph-based algorithm. In other embodiments, the subproblem instruction generator 5489 may retrieve from the algorithm database 530 implementation parameters to use in configuring a more generic form of graph-based algorithm to be operable as an appropriate specialized form of graph-based algorithm from which an appropriate set of subproblem instructions 579 may be generated. In such embodiments, the algorithm database 530 may contain multiple sets of per algorithm data 539 that each include a set of constraints specifically generated to configure the generic form of graph-based algorithm to function as a corresponding specific graph-based algorithm.

Figure 7:
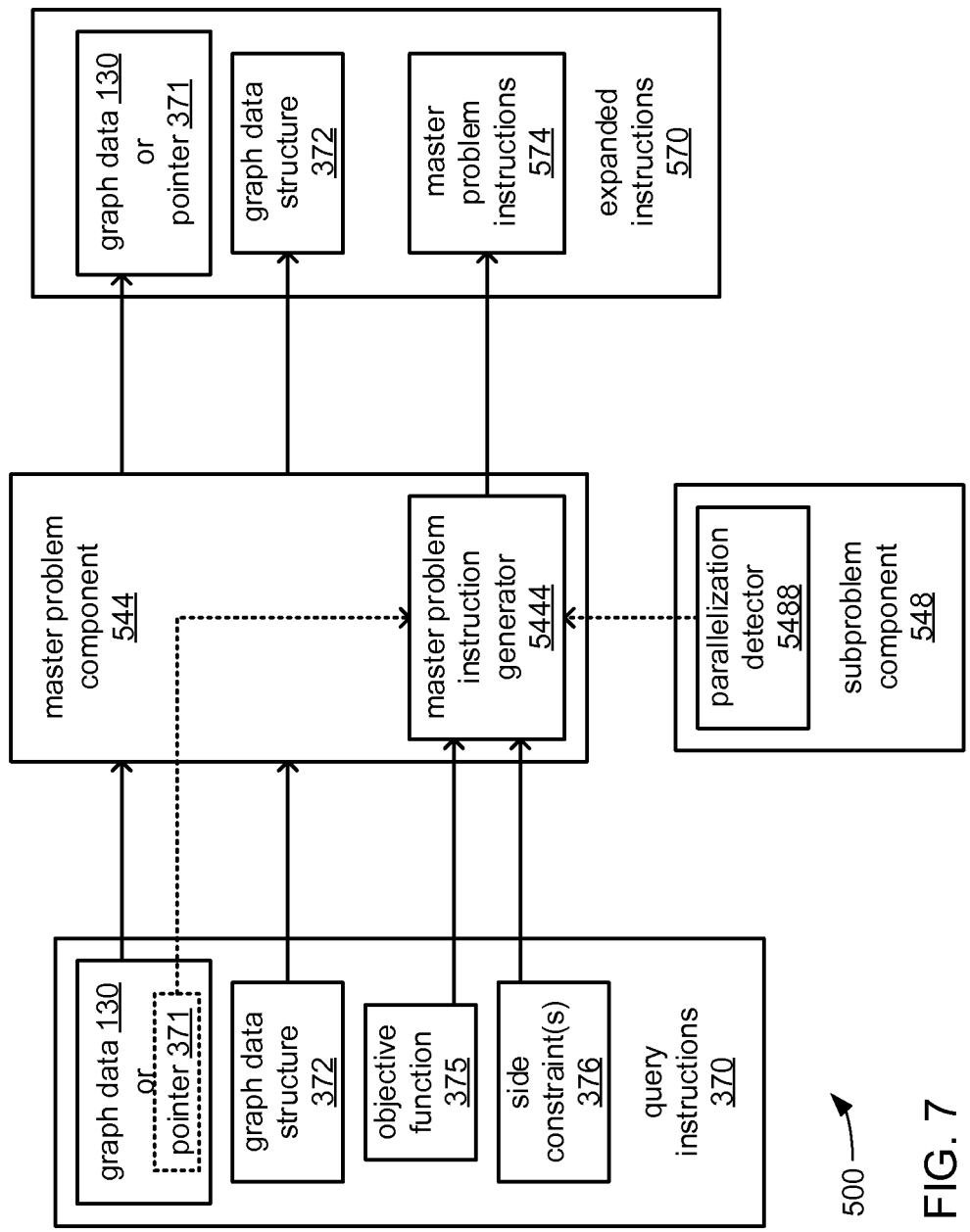

As previously discussed, where a MILP problem is decomposed into more than one subproblem, those subproblems may lack dependencies thereamong such that they may be solvable at least partly in parallel. In some embodiments, the one or more mapping functions 378 that correspond to each of one or more subproblems may include an expression indicating the lack of a dependency by each subproblem on a result from solving any of the other subproblems (e.g., the depicted ".block" suffix). The subproblem component 548 may additionally include a parallelization detector 5488 to determine whether each of the one or more mapping functions 378 (or some other portion of the query instructions 370) includes an indication of such a lack of dependencies among multiple subproblems. Upon detecting such an indication, the parallelization detector 5488 may convey that indication to the subproblem instruction generator 5489, and the subproblem instruction generator 5489 may generate multiple ones of the subproblem instructions 579 in a manner amenable to being executed at least partly in parallel in response. Turning to FIG. 7, the master problem component 544 may, in turn, include a master problem instruction generator 5444 to perform the work of generating the master problem instructions 574 within the expanded instructions 570 for solving the master problem. In so doing, the master problem instruction generator 5444 may embed the pointer 371 to the graph data 130 or at least a portion of the graph data 130, itself, into the master problem instructions 574. Again, as previously discussed, where a MILP problem is decomposed into more than one subproblem, those subproblems may lack dependencies thereamong such that they may be solvable at least partly in parallel. Where the parallelization detector 5488 of the subproblem component 548 determines that there is a lack of dependencies among multiple subproblems, the parallelization detector 5488 may convey that indication to the master problem instruction generator 5444, and the master problem instruction generator 5444 may generate the master problem instructions 574 to interact with multiple ones of the subproblem instructions 579 in a manner that accommodates the at least partly parallel execution thereof.

Returning to FIG. 5, in some embodiments, the expanded instructions 570 may be generated by altering the query instructions 370, thereby more easily allowing other instructions unrelated to the solving of a MILP problem to be carried over to the expanded instructions 570. More specifically, the decomposition component 543 may replace the expressions of the objective function 375 and the side constraints 376 within the query instructions 370 with the master problem instructions 574. The decomposition component 543 may also replace the expressions of the one or more mapping functions 378 and the one or more graph-based algorithm selections 379 within the query instructions 370 with a corresponding one or more subproblem instructions 578. In this way, the expressions of the graph data 130, the pointer 371 and/or the graph data structure 372 may be carried over to the expanded instructions 570 without the performance of copy operations.

Below is presented an example of the manner in which there may be an indication in the query instructions 370 that multiple subproblems into which a MILP problem may be decomposed do not have dependencies thereamong such that they may be solved at least partly in parallel. Specifically, an example of a kidney exchange problem is presented:

---

Example of Graph Data 130 and Query Instructions 370 for a Kidney Exchange Example

```
data ArcData;
   input i j weight @@;
   datalines;
0 1 0.97009  0 2 0.25940  0 7 0.06657  1 2 0.95702  1 3 0.27261
1 6 0.68824  1 7 0.55855  1 8 0.47579  2 4 0.72836  2 9 0.39104
3 0 0.67953  3 1 0.16653  3 4 0.93464  3 7 0.13559  3 9 0.17611
4 1 0.12455  4 2 0.19955  4 6 0.04937  4 8 0.02271  5 1 0.94694
5 3 0.17517  5 4 0.61486  5 6 0.07174  5 7 0.71143  5 8 0.14797
6 0 0.32520  6 2 0.43921  6 9 0.33133  7 1 0.18067  7 2 0.65321
7 3 0.03798  7 4 0.42773  7 9 0.30602  8 0 0.34905  8 6 0.64565
9 2 0.02544  9 5 0.85339  9 6 0.37732
;
%let max_length = 8;
proc optmodel;
   set <num,num> ARCS;
   num weight (ARCS);
   read data ArcData into ARCS=[i j] weight;
   set NODES = union |<i,j> in ARCS| |i,j|};
   set MATCHINGS = 1..card(NODES)/2;
   /* UseNode[i,m] = 1 if node is used in matching m, 0 otherwise */
   var UseNode (NODES, MATCHINGS) binary;
   /* UseArc[i,j,m] = 1 if arc (i,j) is used in matching m, 0 otherwise */
   var UseArc (ARCS, MATCHINGS) binary;
   /* maximize total weight of arcs used */
   max TotalWeight
      = sum (<i,j> in ARCS, m in MATCHINGS] weight[i,j] *
      UseArc[i,j,m]
```

Example of Graph Data 130 and Query Instructions 370 for
a Kidney Exchange Example

```
/* each node appears in at most one matching */
/* rewrite as set partitioning (so decomp uses identical blocks)
   sum( ) x <= 1 => sum( ) x + s = 1, s >= 0 with no associated cost */
var Slack (NODES) binary;
con Packing (i in NODES):
   sum (m in MATCHINGS) UseNode[i,m] + Slack[i] = 1;
/* solve using decomp, with network (CYCLE) subproblem */
con CycleCon (m in MATCHINGS):
   cycle({<i,j> in ARCS| UseArc(i,j,m], minlength=2,
          maxlength=&max_length, graph_direction=directed);
   for (m in MATCHINGS) CycleCon[m].block = m;
set CYCLES = 1..card(NODES)/2;
num n = card(NODES);
num node_id (i in NODES, c in CYCLES) = i+(c−1)*n;
for (i in NODES, c in CYCLES)
   UseNode[i,c].node = node_id[i,c];
for <i,j> in ARCS, c in CYCLES) do;
   UseArc[i,j,c].from = node_id[i,c];
   UseArc[i,j,c].to = node_id[j,c];
end;
solve with MILP / decomp;
quit;
```

In this kidney exchange problem example, mapping functions are set forth for a set of subproblems. Specifically, there is one mapping of the decision variable UseNode[i,c] to the nodes of a graph via the ".node" suffix, within a "for" loop, and there is another mapping of the decision variable UseArc[i,j,c] to the edges of the same graph that each have a head node specified by node_id[j,c] via the ".to" suffix and a tail node specified by node_id[i,c] via the ".from" suffix within another "for" loop. A ".block" suffix indicates that these multiple subproblems are each not dependent upon the results of solving the others such that they may be solved at least partly in parallel.

As can be seen, expressing this example kidney problem as a side-constrained graph problem results in a less complex expression than in the instructions in the below PRIOR ART example of instructions to solve this same kidney problem as a MILP problem:

PRIOR ART Example of Instructions to Solve a
Kidney Exchange Example as a MILP Problem

```
proc optmodel;
   set <num,num> ARCS;
   num weight (ARCS);
   read data ArcData into ARCS=[i j] weight;
   set NODES = union <i,j> in ARCS|{i,j};
   set MATCHINGS = 1..card(NODES)/2;
   /* UseNode[i,m] = 1 if node i is used in matching m, 0 otherwise */
   var UseNode (NODES, MATCHINGS) binary;
   /* UseArc[i,j,m] = 1 if arc (i,j) is used in matching m, 0 otherwise */
   var UseArc {ARCS, MATCHINGS} binary;
   /* maximize total weight of arcs used */
   max TotalWeight
      = sum |<i,j> in ARCS, m in MATCHINGS) weight[i,j] *
        UseArc[i,j,m];
   /* each node appears in at most one matching */
   /* rewrite as set partitioning (so decomp uses identical blocks)
      sum( ) x <= 1 => sum( ) x + s = 1, s >= 0 with no associated cost */
   var Slack (NODES) binary;
   con Packing (i in NODES);
      sum {m in MATCHINGS} UseNode(i,m) + Slack[i] = 1;
   /* at most one recipient for each donor */
   con Donate (i in NODES, m in MATCHINGS):
      sum (<(i),j> in ARCS) UseArc[i,j,m] = UseNode[i,m];
   /* at most one donor for each recipient */
   con Receive (j in NODES, m in MATCHINGS):
      sum (<i, (j)> in ARCS) UseArc(i,j,m) = UseNode[j,m];
```

PRIOR ART Example of Instructions to Solve a
Kidney Exchange Example as a MILP Problem

```
   /* exclude long matchings */
   con Cardinality (m in MATCHINGS):
      sum (<i,j> in ARCS) UseArc[i,j,m]<= &max_length;
   /* solve using decomp, with MILP subproblem */
   for (i in NODES, m in MATCHINGS) Donate[i,m].block = m;
   for (j in NODES, m in MATCHINGS) Receive[j,m].block = m;
   for (m in MATCHINGS) Cardinality(m).block = m;
   solve with milp / presolver=basic decomp;
quit;
```

In particular, solving this PRIOR ART example as a MILP problem entails the use of three sets of constraints vs. a single set of predicate constraints as a result of solving using a graph-based algorithm. Overall, as these examples illustrate, expressing a MILP problem in the query instructions 370 as a side-constrained graph problem reduces the level of understanding of the field of MILP problems required to generate the query instructions 370. Additionally, the processing demands of solving one or more subproblems with graph-based algorithms required of one or more of the processor components 550 is considerably reduced such that less time is required to solve each MILP problem, thereby enabling the one or more computing devices 500 to more quickly proceed through solving multiple MILP problems in less time. This contributes to quicker solution as result of using a graph-based algorithm.

Returning to FIG. 4, the control routine 540 may include an execution control component 545 executable by the processor component 550 of at least one of the one or more computing devices 500 to execute the expanded instructions 570 to solve the master problem and the one or more subproblems of the MILP problem following its decomposition by which the expanded instructions 570 were generated. More specifically, the execution control component 545 at least controls the execution of the master program instructions 574 and the one or more subproblem instructions 578 through multiple iterations to complete the solving of the MILP problem.

Figure 8A:
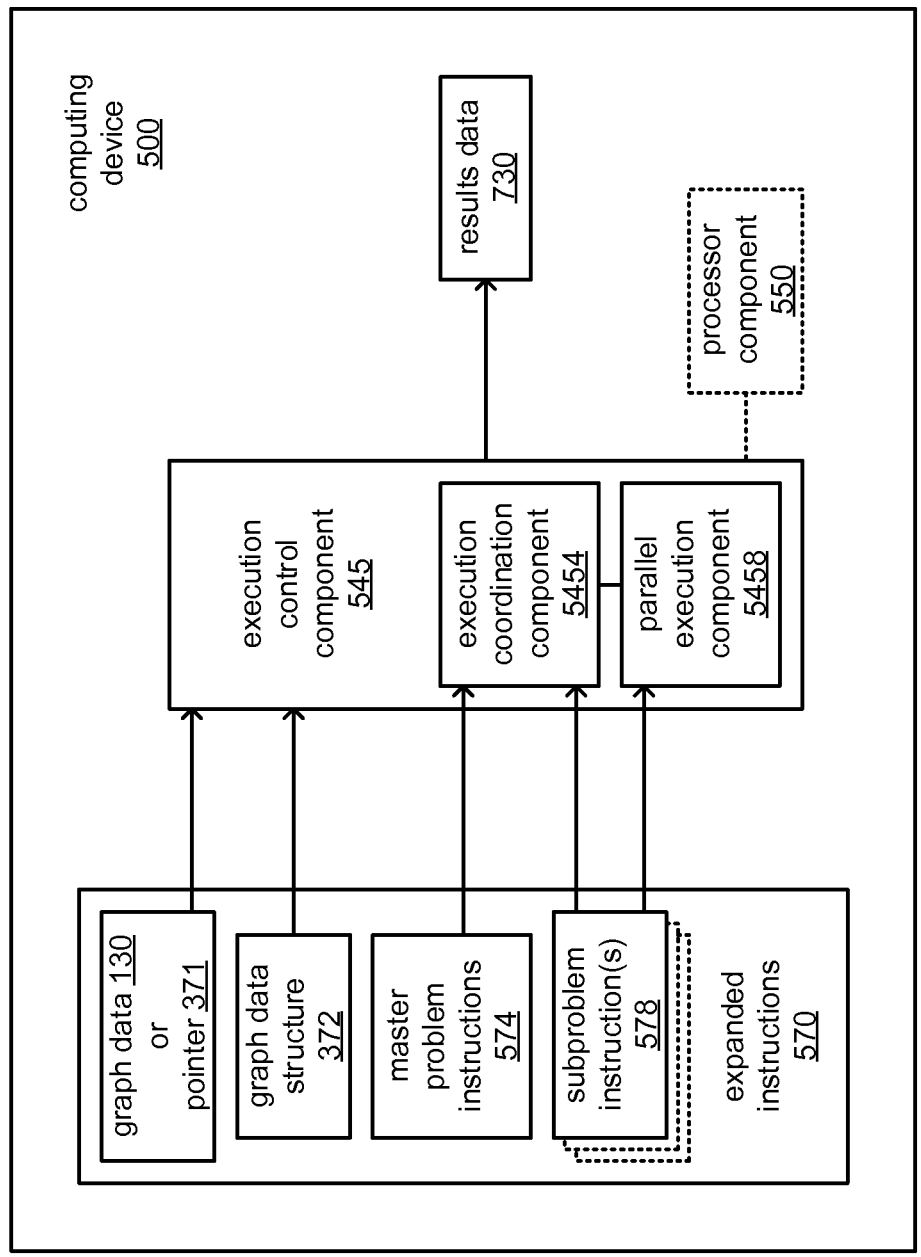
FIGS. 8A and 8B each illustrate an example embodiment of solving a master problem and one or more subproblems to solve a MILP problem.

Turning to FIG. 8A, within a single one of the computing devices 500, the execution control component 545 may include an execution coordination component 5454 to coordinate the alternating executions of the master problem instructions 574 and the one or more subproblem instructions 578 through each of multiple iterations until the solution of the MILP problem is derived in a final iteration. As also depicted in FIG. 8A, the execution control component 545 may include a parallel execution component 5458 to coordinate the at least partly parallel execution of multiple ones of the subproblem instructions 578 where there are multiple subproblems that do not have dependencies thereamong such that at least partial parallel execution of the multiple subproblems is possible. As further depicted in FIG. 8A, such parallel execution of multiple subproblem instructions 578 may be performed by the processor component 550 of a single one of the computing devices 500 where the processor component 550 includes multiple cores and/or other support for parallel threads of execution.

Figure 8B:
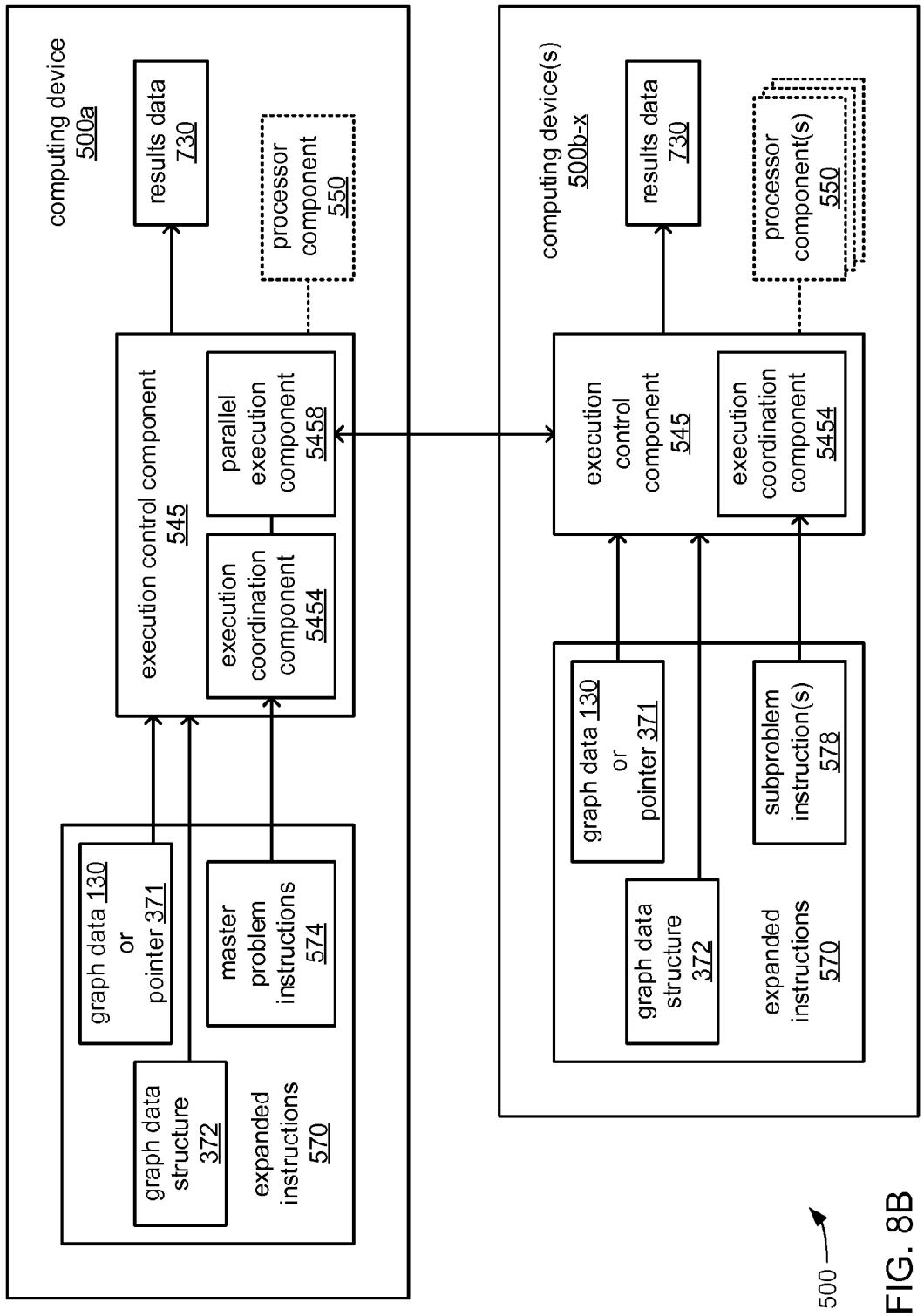

However, as previously discussed and turning to FIG. 8B, where there are multiple subproblems that are able to be solved at least partly in parallel during each iteration, the execution of the multiple subproblem instructions 578 may be distributed among the processor components 550 of multiple ones of the computing devices 500 to effect such at least partial parallel execution thereof. More specifically, the master problem instructions 574 may be executed in one of the computing devices 500 designated as computing device 500a under the control of the execution control component 545 therein. Within the computing device 500a, the execution coordination component 5454 and the parallel execution component 5458 may cooperate to coordinate execution of the master problem instructions 574 within each iteration with the execution of multiple ones of the subproblem instructions 578 within each of multiple others of the computing devices 500 designated as computing devices 500b through 500x. Within each of the computing devices 500b-x, the execution coordination component 5454 may independently coordinate the execution of one of the subproblem instructions 578 within that one of the computing devices 500b-x and within each iteration with the execution of the master problem instructions 574 within the computing device 500a.

Returning to FIG. 4, regardless of whether one or more than one of the computing devices 500 is employed in executing portions of the expanded instructions 570 to solve a MILP problem, the execution control component 545 may store an indication of the solution within the storage 560 of at least one of the computing devices 500 as the results data 730. As has been discussed, the results data 730 may or may not be generated to include a visualization of the solution before being transmitted to one or more other computing devices, such as the computing device 300 or the viewing device 700.

Returning to FIGS. 1A and 1B, the processor component 550 of each of the one or more computing devices 500 may be selected to efficiently solve multiple subproblems into which a MILP problem may be decomposed at least partly in parallel to speed the solution of each of the subproblems in each iteration. By way of example, the processor component 550 may incorporate a single-instruction multiple-data (SIMD) architecture, may incorporate multiple processing pipelines, and/or may incorporate the ability to support multiple simultaneous threads of execution per processing pipeline. Alternatively or additionally, and as has been discussed, the solution of multiple subproblems at least partly in parallel may be carried out by multiple ones of the computing devices 500 operating at least partly in parallel with each other.

Each of these computing devices may be any of a variety of types of computing device that incorporates at least the processing resources to enable efficient decomposition of a MILP problem into a master problem and one or more subproblems. Each of these computing devices may be any of a variety of types of computing device that incorporates at least the processing resources to enable efficient performance of iterations of alternating between solving the master problem and the one or more subproblems.

In various embodiments, each of the processor components 350 and 550 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are linked.

In various embodiments, each of the storages 360 and 560 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the network interfaces 390 and 590 may employ any of a wide variety of communications technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 9:
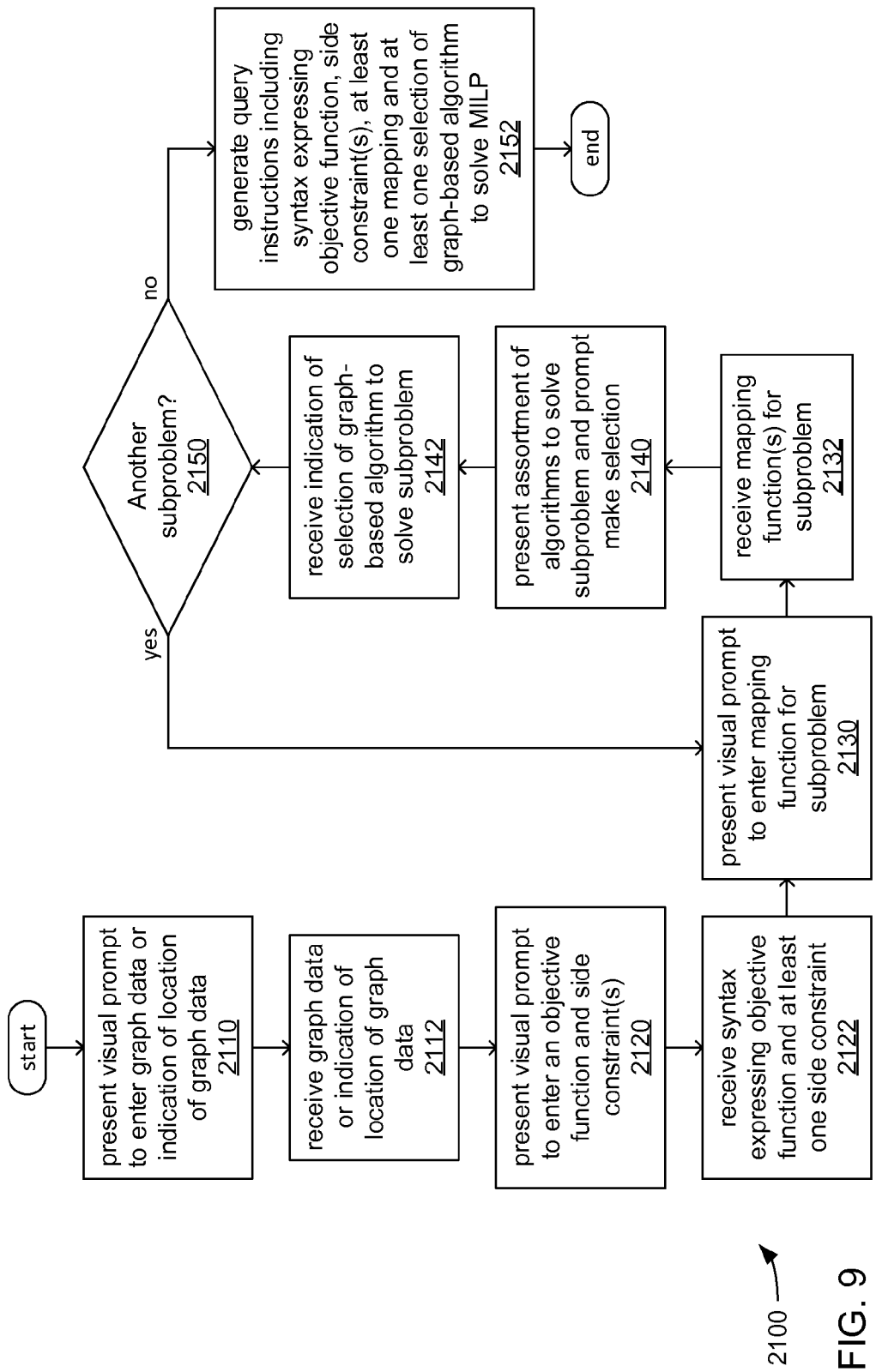
FIG. 9 illustrates an example embodiment of a logic flow of prompting an operator through providing information needed to solve a MILP problem.

FIG. 9 illustrates an example embodiment of a logic flow 2100. The logic flow 2100 may be representative of some or all of the operations executed by one or more embodiments described herein. More specifically, the logic flow 2100 may illustrate operations performed by the processor component 350 in executing the control routine 340, and/or performed by other component(s) of at least the computing device 300.

At 2110, a processor component of a computing device (e.g., the processor component 350 of the computing device 300) may present a visual prompt on a display of the computing device (e.g., the display 380) requesting an operator of the computing device to enter graph data or a pointer to the graph data for a MILP problem (e.g., the graph data 130 or the pointer 371). At 2112, the processor may monitor manually-operable controls of the computing device (e.g., the controls 320) for an indication of those controls being manually operated to receive the graph data or the pointer thereto.

At 2120, the processor component may present a visual prompt on the display requesting the operator to enter an objective function and one or more side constraints. At 2122, the processor may monitor manually-operable controls for an indication of those controls being manually operated to receive the objective function and the one or more side constraints.

At 2130, the processor component may present a visual prompt on the display requesting the operator to enter a mapping function for a subproblem into which the MILP problem is to be decomposed. At 2132, the processor may monitor manually-operable controls for an indication of those controls being manually operated to receive the mapping function.

At 2140, the processor component may present a visual prompt on the display that includes an assortment of graph-based algorithms able to be selected to solve the subproblem, and that requests the operator to make a selection from among the assortment. At 2142, the processor may monitor manually-operable controls for an indication of those controls being manually operated to receive an indication of which graph-based algorithm is selected by the operator.

At 2150, a check may be made by the processor component of whether there is another subproblem for which a mapping and a graph-based algorithm need to be specified. If not, then the processor component, at 2152, may generate query instructions that include expressions of the objective function, the one or more side constraints, and both at least one mapping and at least one selection of a graph-based algorithm corresponding to at least one subproblem. However, if there is another subproblem for which a mapping and a graph-based algorithm need to be specified at 2150, then the presentation of visual prompt to enter a mapping function is repeated at 2130.

Figure 10:
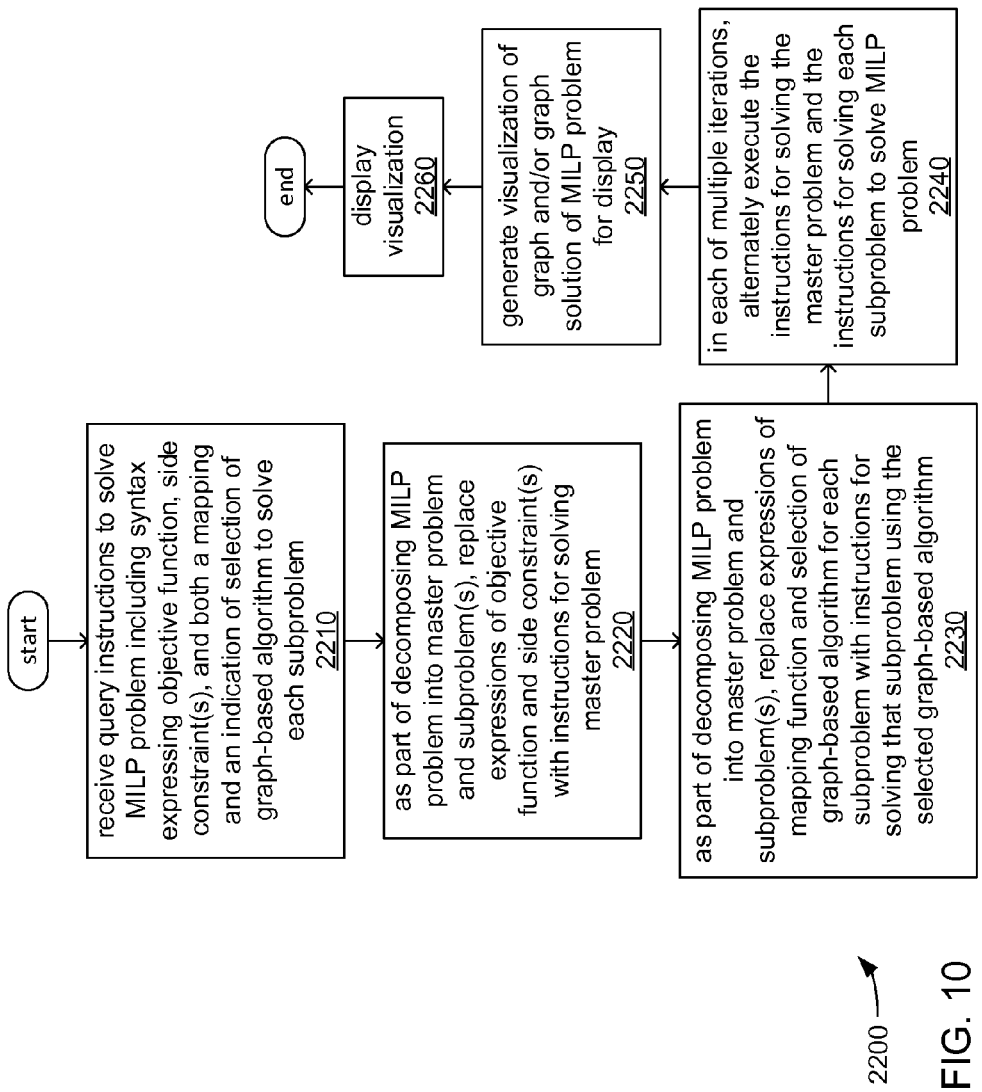
FIG. 10 illustrates an example embodiment of a logic flow of decomposing and solving a MILP problem as a side-constrained graph problem.

FIG. 10 illustrates an example embodiment of a logic flow 2200. The logic flow 2200 may be representative of some or all of the operations executed by one or more embodiments described herein. More specifically, the logic flow 2200 may illustrate operations performed by the processor component 550 of one of the one or more computing devices 500 in executing the control routine 540, and/or performed by other component(s) of that one of the one or more computing device 500.

At 2210, a processor component of a computing device (e.g., the processor component 550 of one of the one or more computing devices 500) may receive query instructions to solve a MILP problem in which the query instructions present the MILP problem as a side-constrained graph problem. More specifically, the query instructions may include syntax in the form of commands, declarations and/or other instructions expressing an objective function, one or more side constraints, and both a mapping and a selection of a graph-based algorithm for each subproblem.

At 2220, as part of decomposing the MILP problem, the processor component may replace the expressions of the objective function and the one or more side constraints with instructions for solving the master problem. Correspondingly and also as part of decomposing the MILP problem, at 2230, the processor component may replace the expressions of a mapping and a selection of a graph-based algorithm for each subproblem with instructions for applying that specified graph-based algorithm and that mapping to solve that subproblem.

At 2240, the processor component may, in each of multiple iterations that continue until the solving of the MILP problem is completed, alternately execute the instructions for solving the master problem and execute the instructions for solving the one or more subproblems. As has been discussed, the MILP problem may be decomposed into more than one subproblem and those subproblems that may not have dependencies thereamong such that those subproblems are able to be solved at least partly in parallel. Where this is the case, the processor component may so solve multiple subproblems at least partly in parallel in each iteration.

At 2250, following the solution of the MILP problem, the processor component may generate a visualization of the solution to the MILP problem. The processor component may then display that visualization on a display at 2260 or transmit that visualization to another computing device to enable the visualization to be displayed on a display of that other computing device (e.g., the display 380 of the computing device 300, or the display 780 of the viewing device 700).

Figure 11:
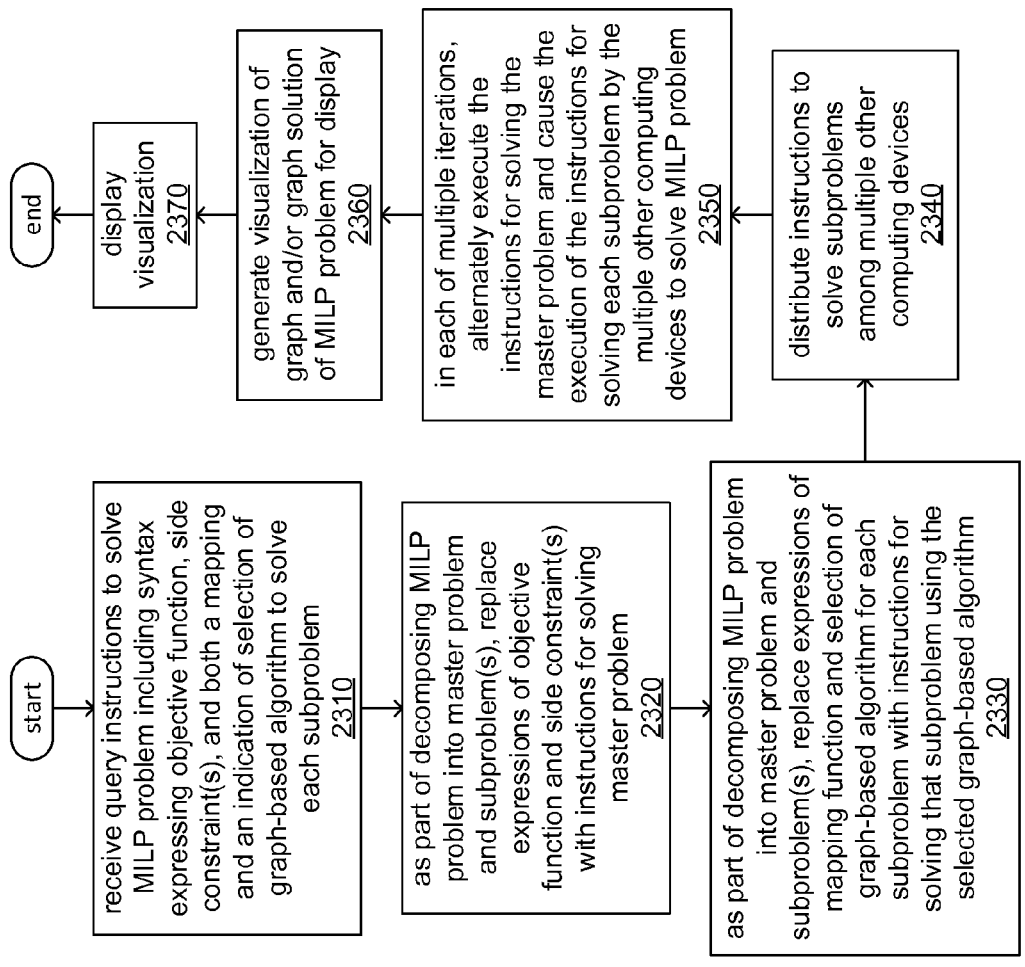
FIG. 11 illustrates another example embodiment of a logic flow of decomposing and solving a MILP problem as a side-constrained graph problem.

FIG. 11 illustrates an example embodiment of a logic flow 2300. The logic flow 2300 may be representative of some or all of the operations executed by one or more embodiments described herein. More specifically, the logic flow 2300 may illustrate operations performed by the processor component 550 of one of the one or more computing devices 500 in executing the control routine 540, and/or performed by other component(s) of that one of the one or more computing device 500.

At 2310, 2320 and 2330, a processor component of a computing device (e.g., the processor component 550 of one of the one or more computing devices 500) may perform various actions that are quite similar to what is described at 2210, 2220 and 2230 of the logic flow 2200, above. Such actions may be performed as part of decomposing a MILP problem into a master problem and multiple subproblems.

At 2340, the processor component may distribute the instructions to solve each of the multiple subproblems separately to each of multiple other computing devices to enable the multiple other computing devices to solve their associated ones of the multiple subproblems at least partly in parallel. Again, doing so requires that the multiple subproblems not have any dependencies on the solutions derived by any of the other subproblems.

At 2350, the processor component may, in each of multiple iterations that continue until the MILP problem is solved, alternately execute the instructions for solving the master problem and coordinate the execution of the instructions for separately solving each of the multiple subproblems by each of the multiple other computing devices. As part of such coordination, the processor component may trigger such separate executions of instructions for solving each of the multiple subproblems to occur at least partly in parallel.

At 2360, following the solution of the MILP problem, the processor component may generate a visualization of the solution to the MILP problem. The processor component may then display that visualization on a display at 2370 or transmit that visualization to another computing device to enable the visualization to be displayed on a display of that other computing device (e.g., the display 380 of the computing device 300, or the display 780 of the viewing device 700).

Figure 12:
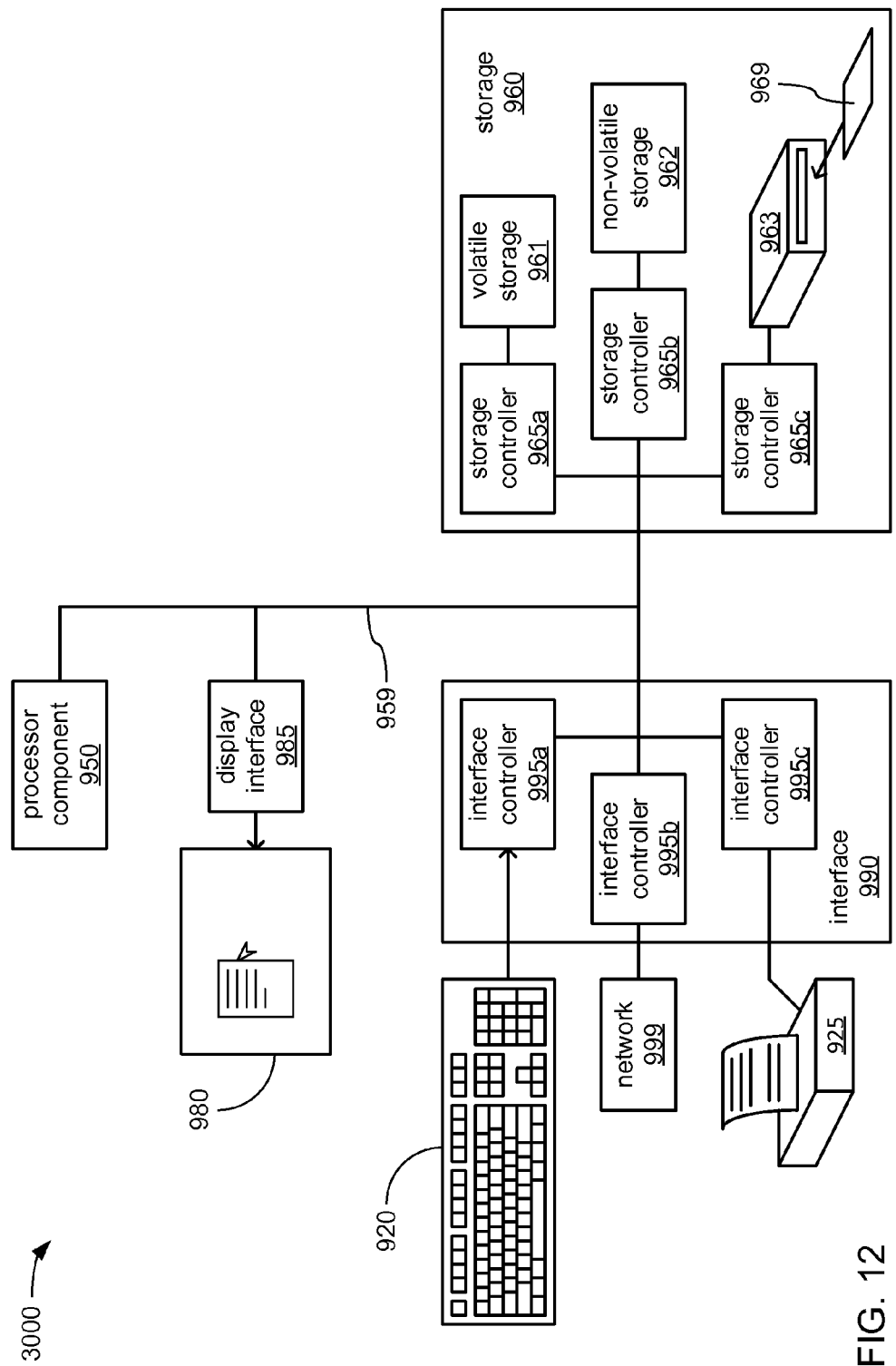
FIG. 12 illustrates an example embodiment of a processing architecture.

FIG. 12 illustrates an example embodiment of a processing architecture 3000 suitable for implementing various embodiments as previously described. More specifically, the processing architecture 3000 (or variants thereof) may be implemented as part of one or more of the computing devices 300*a-e*, 500 or 700, or the controller 600. It should be noted that components of the processing architecture 3000 are given reference numbers in which the last two digits correspond to the last two digits of reference numbers of at least some of the components earlier depicted and described as part of the computing devices 300, 500 and 700, as well as the controller 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the unidirectional or bi-directional exchange of information. For instance, the components may communicate information over the communications media. The information can be implemented as transmissions allocated to one or more electrical and/or optical conductors. A message (including a command, status, address or data message) may be one of such transmissions or may be a plurality of such transmissions, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a touch screen 980 incorporating a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which commands and/or data are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to one or more of the processor components 550, 650 and 750) may include any of a wide variety of commercially available processors, employing any of a wide variety of technologies and implemented with one or more cores physically combined in any of a number of ways.

As previously discussed, the storage 960 (corresponding to one or more of the storages 560, 660 and 760) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as including multiple distinct types of storage is in recognition of the commonplace use of more than one type of storage device in computing devices in which one type provides relatively rapid reading and writing capabilities enabling more rapid manipulation of data by the processor component 950 (but in which a "volatile" technology may be used constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965*a* providing an appropriate interface to the volatile storage 961 that perhaps employs row and column addressing, and where the storage controller 965*a* may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969. The machine-readable storage medium 969, with executable instructions stored thereon, may be an example embodiment of a computer-program product that may or may not be fabricated in large quantities to enable distribution of those executable instructions.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (which may correspond to one or both of the network interfaces 590 or 790) may employ any of a variety of communications technologies corresponding to any of a variety of communications technologies that may be employed to communicatively couple a computing device to one or more other devices. Again, one or both of various forms of wired or wireless communications may be employed to enable the processor component 950 to interact with input/output devices (e.g., the depicted example keyboard 920 or printer 925) and/or other computing devices, where such interaction may be through a network (e.g., the network 999) or an interconnected set of networks. In recognition of the often greatly different character of multiple types of timings and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless timings and/or protocols to access other computing devices through the depicted network 999 (perhaps a network made up of one or more links, smaller networks, or perhaps the Internet). The interface controller 995c may employ any of a variety of electrically conductive cabling enabling the use of either serial or parallel transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data provided by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to the display 780), such a computing device implementing the processing architecture 3000 may also include the display interface 985. Although more generalized types of interface may be employed in communicatively coupling to a display (whether of the touch screen variety, or not), the somewhat specialized additional processing often required in visually displaying various forms of content on a display, as well as the somewhat specialized nature of the cabling-based interfaces used, often makes the provision of a distinct display interface desirable. Wired and/or wireless communications technologies that may be employed by the display interface 985 in a communicative coupling of the touch screen 980 may make use of timings and/or protocols that conform to any of a variety of industry standards, including without limitation, any of a variety of analog video interfaces, Digital Video Interface (DVI), DisplayPort, etc.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receiving, by a processing component, computer-executable query instructions to solve a mixed-integer linear programming (MILP) problem, wherein the query instructions comprise:
a first expression conveying an objective function and at least one side constraint of the MILP problem, wherein the objective function and the at least one side constraint define a master problem of the MILP problem;
a second expression conveying a first mapping of data values of graph data associated with the MILP problem to a first graph; and
a third expression conveying a selection of a first graph-based algorithm to solve a first subproblem of the MILP problem based on the first graph;
generating, by the processing component, expanded instructions by at least replacing the third expression in the query instructions with a fourth expression as part of a decomposition of the MILP problem, the fourth expression comprising instructions to implement the first graph-based algorithm to solve the first subproblem;
executing, by the processing component, the expanded instructions to cause operations of an iteration to solve the MILP problem, wherein the operations of the iteration comprise:
executing the first expression to derive a solution to the master problem; and
executing the fourth expression to derive a solution to the first subproblem based on the first mapping and the solution to the master problem; and
generating, by the processing component, results data based on the execution of the expanded instructions, the results data presentable on a display.

2. The computer-implemented method of claim 1, wherein:
the second expression conveys a second mapping of data values of the graph data to a second graph;
the third expression conveys a selection of a second graph-based algorithm to solve a second subproblem of the MILP problem based on the second graph;
the fourth expression comprises instructions to implement the second graph-based algorithm to solve the second subproblem; and
the operations of the iteration comprise executing the fourth expression to derive a solution to the second subproblem based on the second mapping and the solution to the master problem.

3. The computer-implemented method of claim 2, wherein:
the third expression includes an indication that the first and second subproblems are able to be solved independently of each other; and
performing, by the processing component, operations including detecting the indication that the first and second subproblems are able to be solved independently of each other, and generating the fourth expression to cause the derivation of the solutions to the first and second subproblems at least partially in parallel in response to detecting the indication.

4. The computer-implemented method of claim 3, wherein the operations of the iteration comprise deriving the solutions to the first and second subproblems at least partially in parallel.

5. The computer-implemented method of claim 1, comprising:
performing, by the processing component, operations including:
initiating, by the processing component, a performance of the operations of the iteration to solve the MILP problem;
determining, by the processing component, whether the performance of the operations of the iteration solved the MILP problem; and
repeating, by the processing component, performance of the operations of the iteration in response to the MILP problem remaining unsolved.

6. The computer-implemented method of claim 1, wherein:
the data values of the graph data are associated with at least one of nodes of the first graph, or edges of the first graph that each extend between a pair of nodes of the first graph; and
the first graph is a graph of a network comprising the nodes and the edges.

7. The computer-implemented method of claim 1, comprising:
performing, by the processing component, operations including, receiving the graph data, wherein:
the data values of the graph data are associated with nodes of the first graph; and
the second expression comprises instructions to iterate through the nodes of the first graph.

8. The computer-implemented method of claim 1, comprising:
performing, by the processing component, operations including, receiving the graph data, wherein:
the data values of the graph data are associated with edges of the first graph that each extend between a pair of nodes of the first graph; and
the second expression comprises instructions to iterate through the edges of the first graph.

9. The computer-implemented method of claim 1, comprising:
performing, by the processing component, operations including:
receiving the graph data and the query instructions from a computing device via a network; and
transmitting a result of solving the MILP problem to the computing device.

10. The computer-implemented method of claim 1, comprising performing, by the processing component, operations including presenting, by circuitry on the display or another display, guidance to an operator of a computing device in providing the first, second and third expressions, and monitoring manually-operable controls of the computing device to receive the first, second and third expressions.

11. A computer system comprising:
a processor component;
a communications component for execution by the processor component to receive computer-executable query instructions to solve a mixed-integer linear programming (MILP) problem, wherein the query instructions comprise:
a first expression that conveys an objective function and at least one side constraint of the MILP problem, wherein the objective function and the at least one side constraint define a master problem of the MILP problem;

a second expression that conveys a first mapping of data values of graph data associated with the MILP problem to a first graph; and a third expression that conveys a selection of a first graph-based algorithm to solve a first subproblem of the MILP problem based on the first graph;

a subproblem component for execution by the processor component to replace the third expression in the query instructions with a fourth expression as part of a decomposition of the MILP problem, the fourth expression comprising instructions to implement the first graph-based algorithm to solve the first subproblem; and an execution control component for execution by the processor component to perform an iteration of solving the MILP problem, wherein performing the iteration comprises:

executing the first expression to derive a solution to the master problem; and executing the fourth expression to derive a solution to the first subproblem based on the first mapping and the solution to the master problem.

12. The computer system of claim 11, wherein:

the second expression conveys a second mapping of data values of the graph data to a second graph;

the third expression conveys a selection of a second graph-based algorithm to solve a second subproblem of the MILP problem based on the second graph;

the fourth expression comprises instructions to implement the second graph-based algorithm to solve the second subproblem; and performing the iteration comprises executing the fourth expression to derive a solution to the second subproblem based on the second mapping and the solution to the master problem.

13. The computer system of claim 12, wherein:

the third expression includes an indication that the first and second subproblems are able to be solved independently of each other; and the subproblem component is to detect the indication that the first and second subproblems are able to be solved independently of each other, and generate the fourth expression to cause the execution control component to derive the solutions to the first and second subproblems at least partially in parallel in response to detecting the indication.

14. The computer system of claim 13, comprising a parallel execution component for execution by the processor component to coordinate at least partially parallel derivations of the solutions to the first and second subproblems.

15. The computer system of claim 11, wherein the execution control component is to:

initiate a performance of the iteration;

determine whether the performance of the iteration solved the MILP problem; and repeat performance of the iteration in response to the MILP problem remaining unsolved.

16. The computer system of claim 11, wherein:

the data values of the graph data are associated with at least one of nodes of the first graph, or edges of the first graph that each extend between a pair of nodes of the first graph; and the first graph is a graph of a network comprising the nodes and the edges.

17. The computer system of claim 11, comprising a network interface to couple the communications component to a network to receive the graph data, wherein:

the data values of the graph data are associated with nodes of the first graph; and the second expression comprises instructions to iterate through the nodes of the first graph.

18. The computer system of claim 11, comprising a network interface to couple the communications component to a network to receive the graph data, wherein:

the data values of the graph data are associated with edges of the first graph that each extend between a pair of nodes of the first graph; and the second expression comprises instructions to iterate through the edges of the first graph.

19. The computer system of claim 11, comprising a communications component for execution by the processor component to:

receive the graph data and the query instructions from a computing device via a network; and transmit a result of solving the MILP problem to the computing device.

20. The computer system of claim 11, comprising a rendering component for execution by the processor component to generate, by circuitry, a visualization of at least the first graph and of a result of solving the MILP problem for presentation on a display.

* * * * *